(12) United States Patent
Prouzet

(10) Patent No.: US 10,968,972 B2
(45) Date of Patent: Apr. 6, 2021

(54) BRAKE MONITORING SYSTEM

(71) Applicant: Ratier-Figeac SAS, Figeac (FR)

(72) Inventor: Bertrand Prouzet, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 120 days.

(21) Appl. No.: 16/128,574

(22) Filed: Sep. 12, 2018

(65) Prior Publication Data

US 2019/0136927 A1    May 9, 2019

(30) Foreign Application Priority Data

Nov. 8, 2017   (EP) .................................... 17306545

(51) Int. Cl.
| | | |
|---|---|---|
| *F16D 66/02* | (2006.01) | |
| *F16D 55/226* | (2006.01) | |
| *B60T 17/22* | (2006.01) | |
| B64C 27/12 | (2006.01) | |
| B64C 27/82 | (2006.01) | |
| F16D 66/00 | (2006.01) | |

(52) U.S. Cl.
CPC .......... *F16D 66/023* (2013.01); *B60T 17/221* (2013.01); *F16D 55/226* (2013.01); *F16D 66/02* (2013.01); B64C 27/12 (2013.01); B64C 27/82 (2013.01); F16D 2066/003 (2013.01)

(58) Field of Classification Search
CPC ................. F16D 55/226; F16D 65/023; F16D 2066/003; F16D 66/02; F16D 66/023; B60T 17/221; B64C 27/12; B64C 27/82
See application file for complete search history.

(56) References Cited

U.S. PATENT DOCUMENTS 3,606,486 A * 9/1971 Doerfler .................... B60T 8/26
                                                    303/9.72
5,228,541 A * 7/1993 Plude ....................... F16D 66/02
                                                    116/208
(Continued)

FOREIGN PATENT DOCUMENTS

CN          106286651 A      1/2017
DE          2143660 A1       3/1973
(Continued)

OTHER PUBLICATIONS

Extended European Search Report for International Application No. 17306545.9 dated May 24, 2018, 9 pages.

*Primary Examiner* — Melody M Burch
(74) *Attorney, Agent, or Firm* — Cantor Colburn LLP

(57) ABSTRACT

A system for monitoring engagement and wear in a brake include: a pin, a first marker positioned on the pin at a first location; a second marker spaced from the first marker long the pin; and a first fixed sensing arrangement. The pin extends in an axial direction parallel to the axis of rotation, and is in contact with and moves with the moveable brake pad in use. The first fixed sensing arrangement is adapted to provide a first signal when adjacent the first or second marker, and a second signal otherwise. The first and second markers and the first fixed sensing arrangement are positioned such that the second signal indicates that the brake is in the engaged position, and a change from the second signal to the first signal indicates that the moveable brake pad and the second brake pad have been worn down by a predetermined amount.

15 Claims, 19 Drawing Sheets

(56) References Cited

U.S. PATENT DOCUMENTS

| | | | |
|---|---|---|---|
| 5,426,383 A * | 6/1995 | Kumar | H03K 19/09441 326/119 |
| 5,848,673 A | 12/1998 | Strauss et al. | |
| 6,257,374 B1 * | 7/2001 | Strzelczyk | B60T 17/221 188/1.11 E |
| 6,637,262 B2 | 10/2003 | Chang et al. | |
| 8,047,336 B2 | 11/2011 | Niehorster et al. | |
| 8,201,666 B2 | 6/2012 | Devlieg | |
| 8,317,462 B2 | 11/2012 | Daniels et al. | |
| 8,634,971 B2 | 1/2014 | Cahill | |
| 8,717,159 B2 | 5/2014 | Todd et al. | |
| 8,827,046 B2 | 9/2014 | Cahill | |
| 9,441,692 B2 | 9/2016 | Schaefer | |
| 2006/0042734 A1 * | 3/2006 | Turner | B60C 11/24 152/154.2 |
| 2007/0235267 A1 | 10/2007 | Liebert | |
| 2009/0229926 A1 * | 9/2009 | Schaefer | F16D 66/025 188/1.11 L |
| 2010/0206671 A1 * | 8/2010 | Cahill | F16D 66/026 188/1.11 L |
| 2011/0254679 A1 | 10/2011 | Todd et al. | |
| 2013/0299284 A1 * | 11/2013 | Lange | F16D 65/12 188/1.11 L |
| 2015/0152931 A1 * | 6/2015 | Moore | F16D 66/022 188/1.11 L |
| 2015/0369318 A1 * | 12/2015 | Kang | F16D 66/024 188/1.11 L |
| 2016/0146279 A1 * | 5/2016 | Philpott | B60T 8/885 188/1.11 L |

FOREIGN PATENT DOCUMENTS

| | | |
|---|---|---|
| EP | 3072763 A1 | 9/2016 |
| WO | 9850711 A1 | 11/1998 |

* cited by examiner

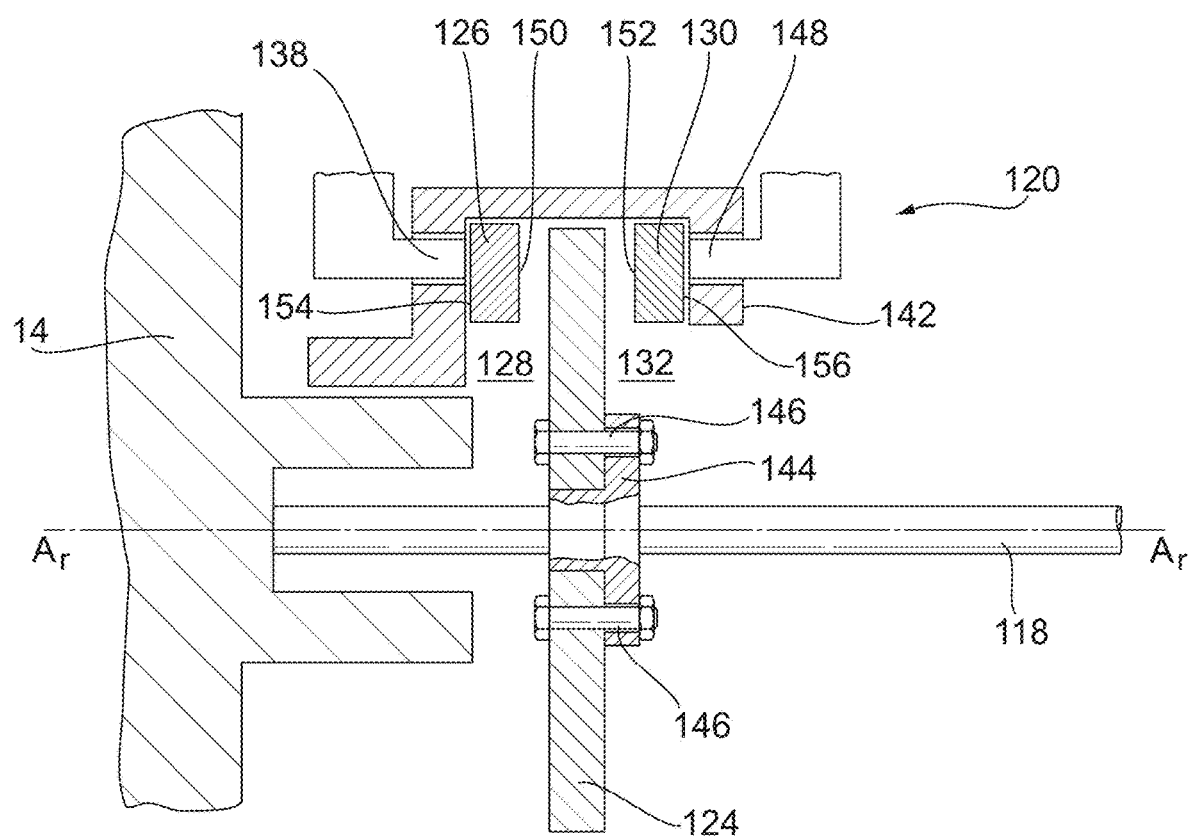

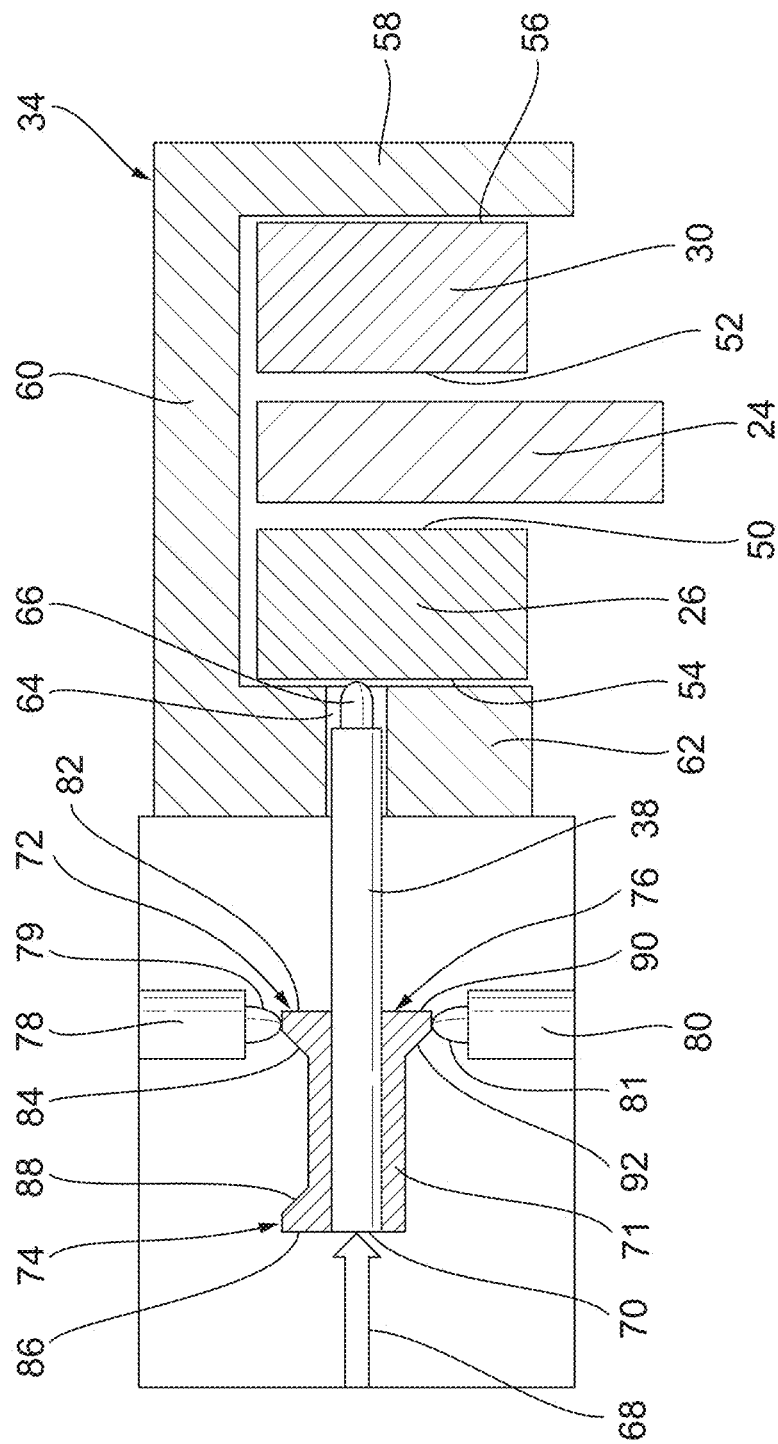

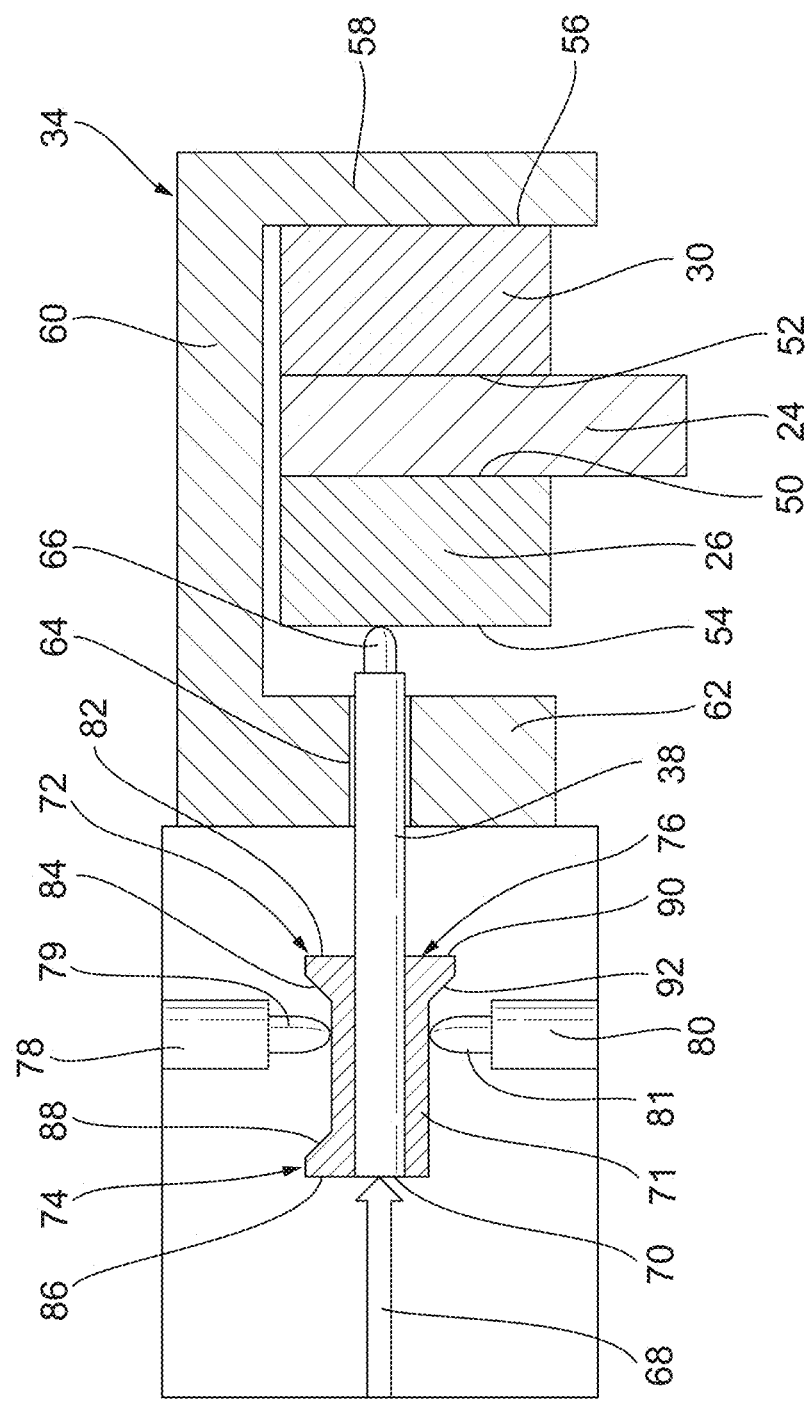

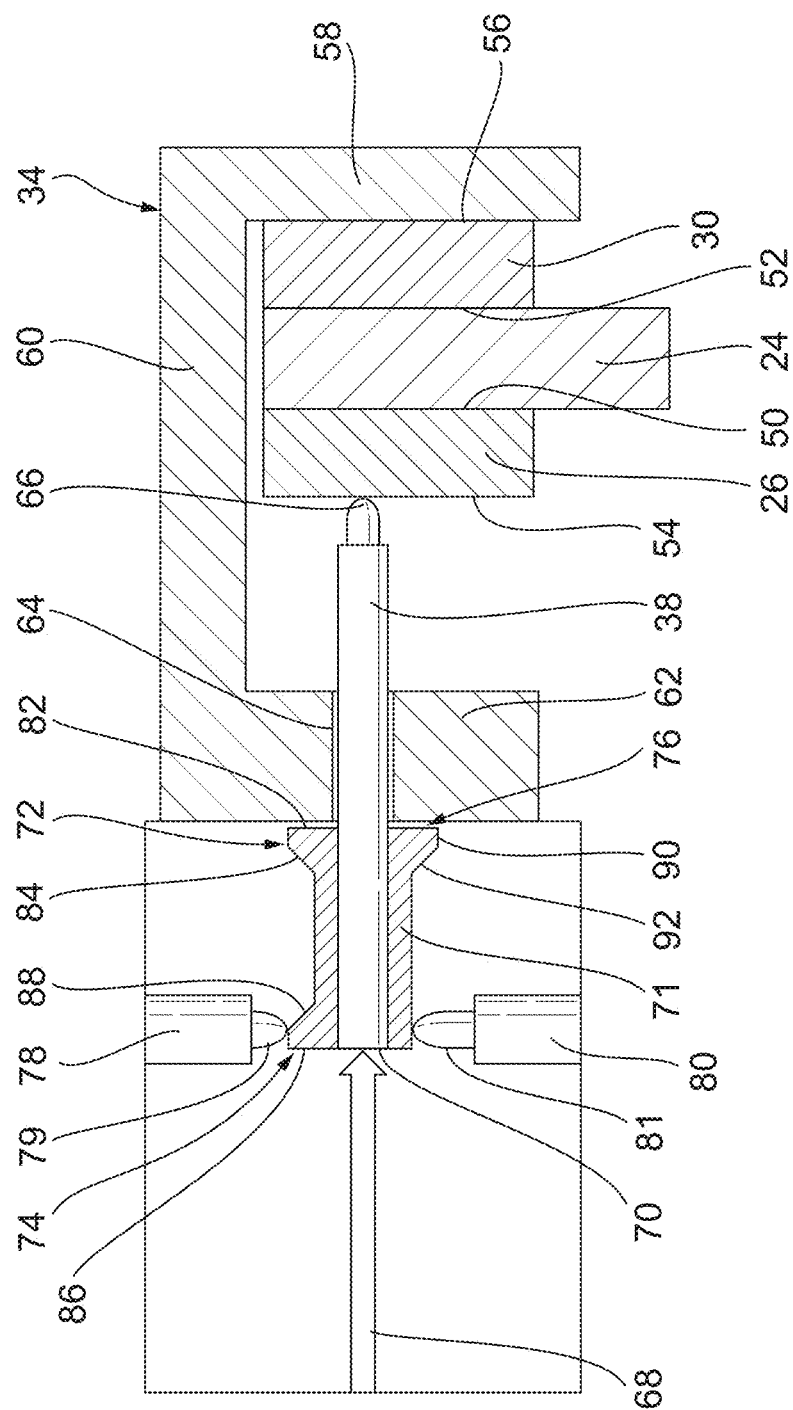

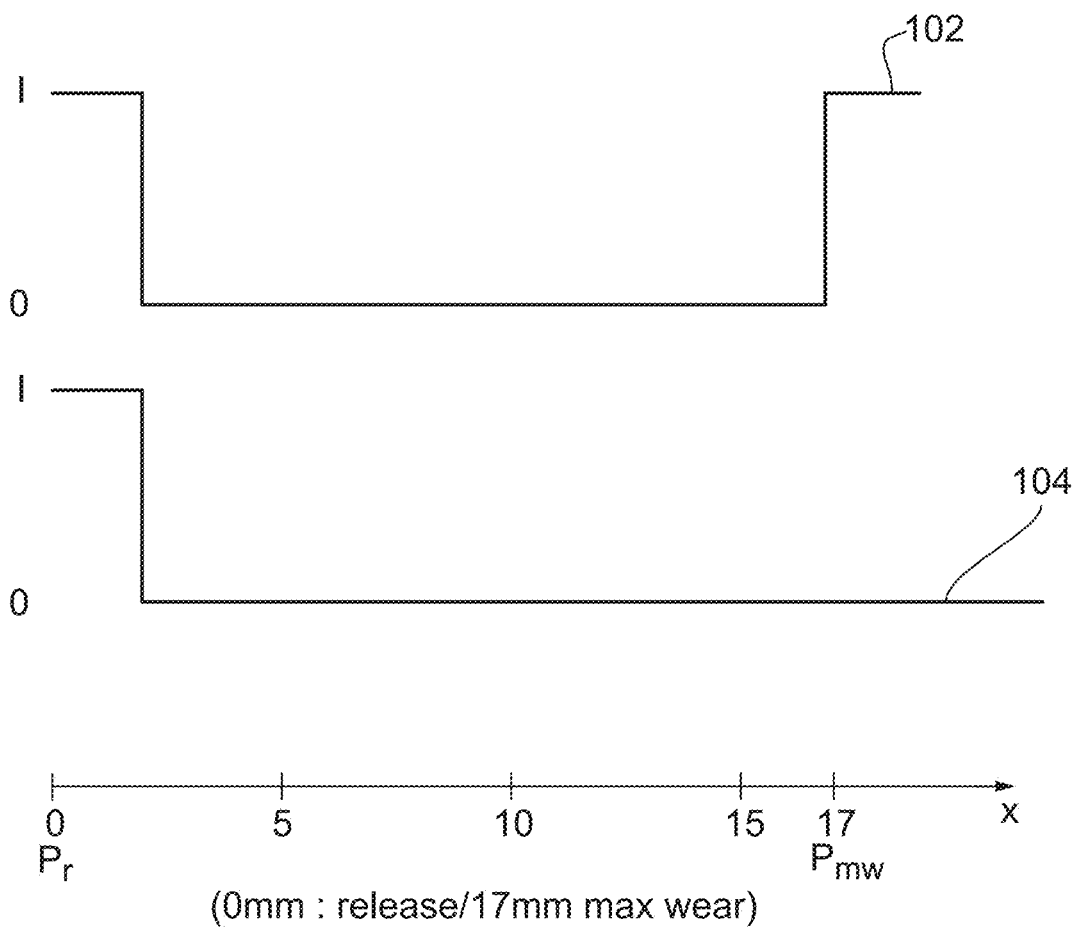

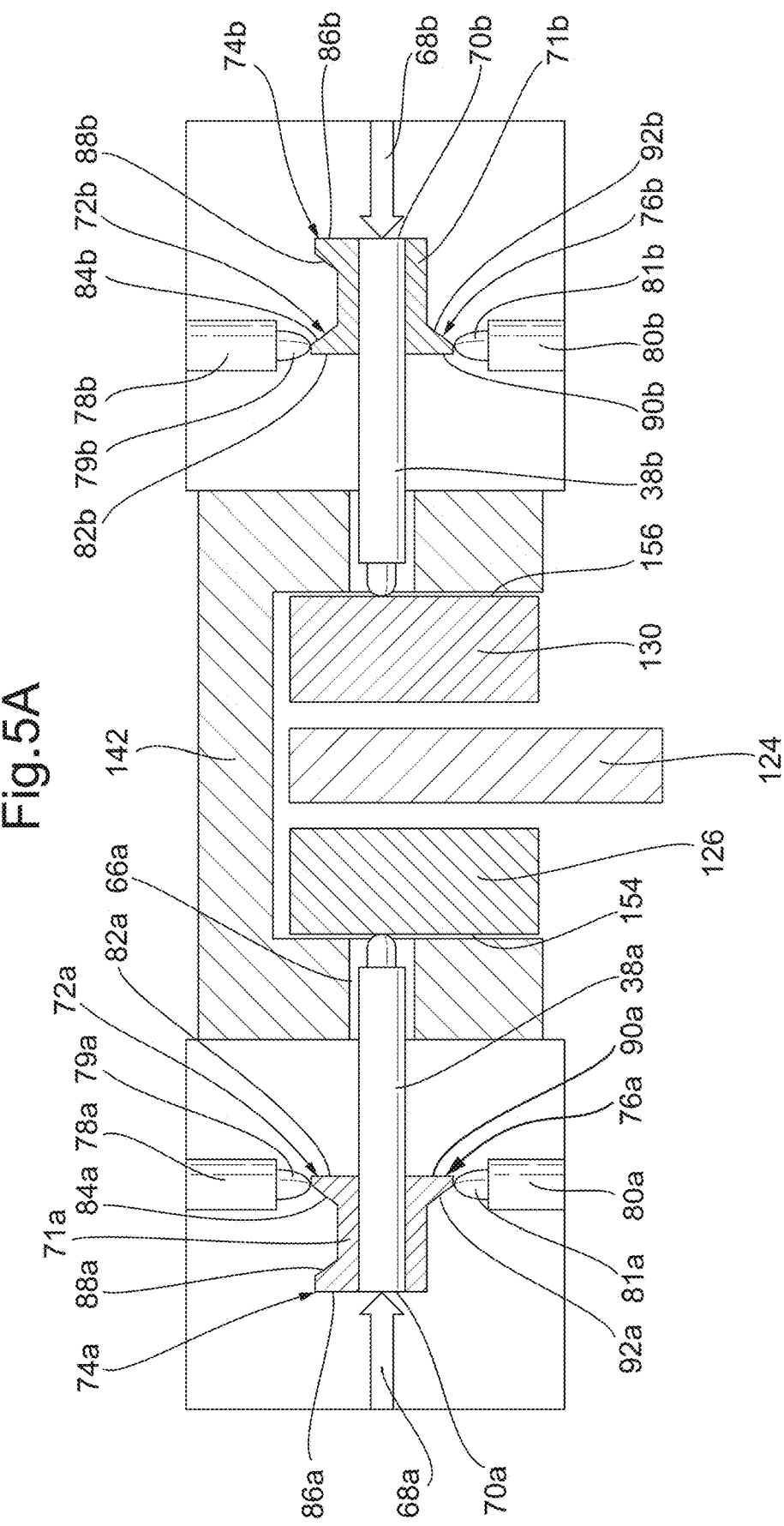

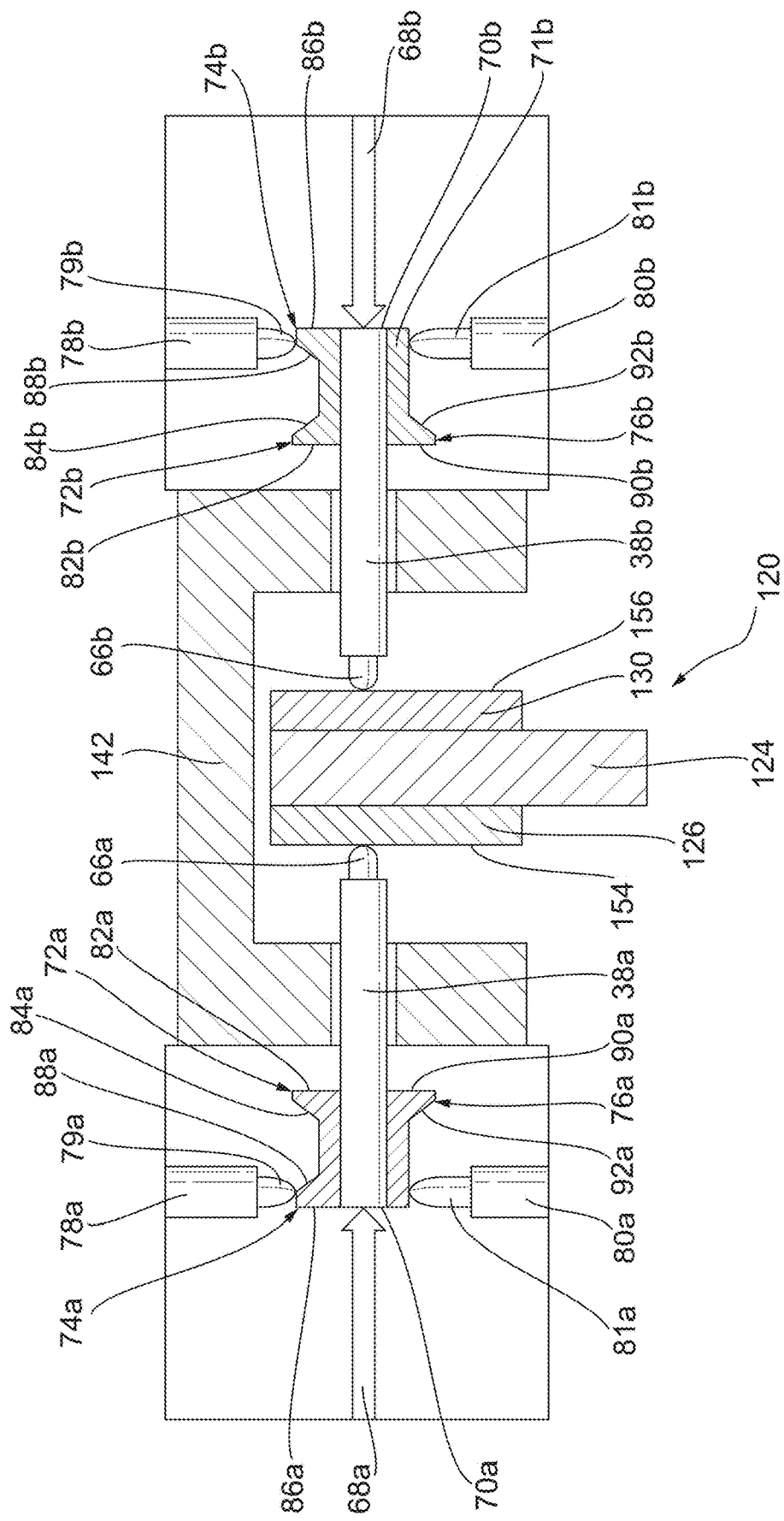

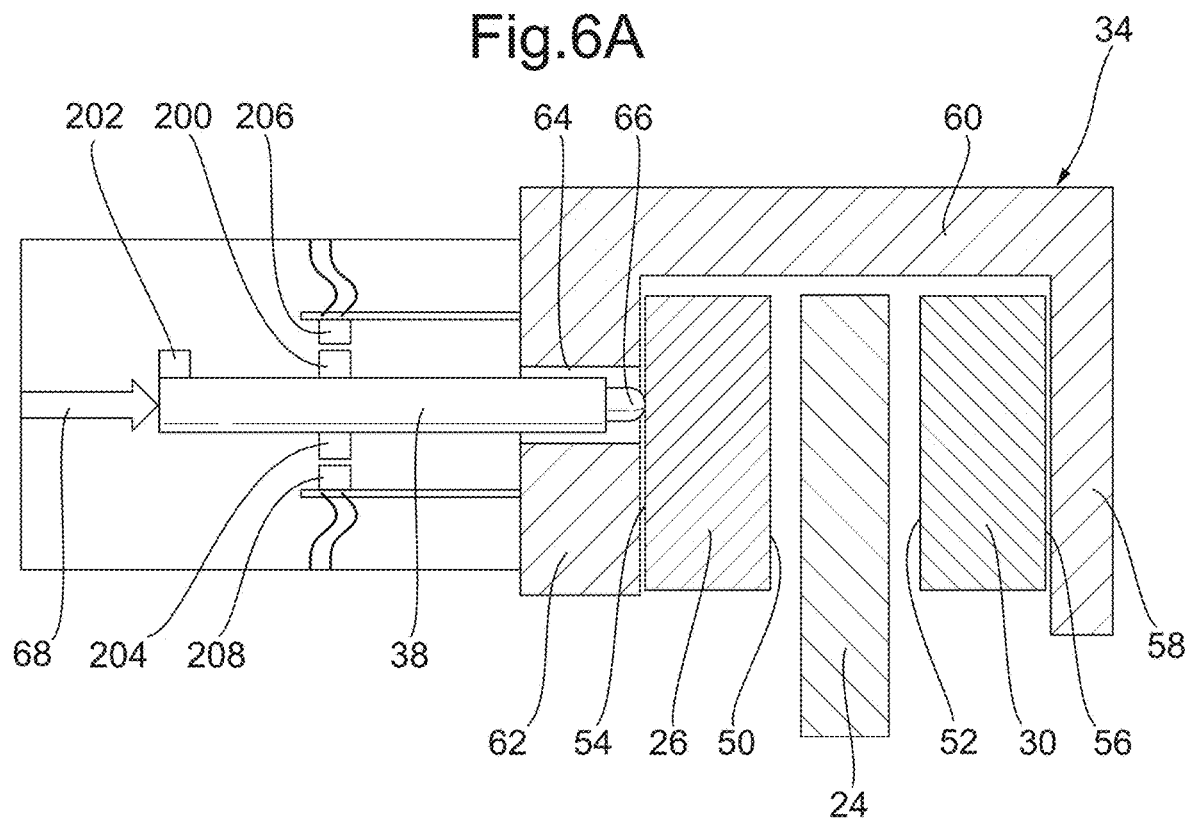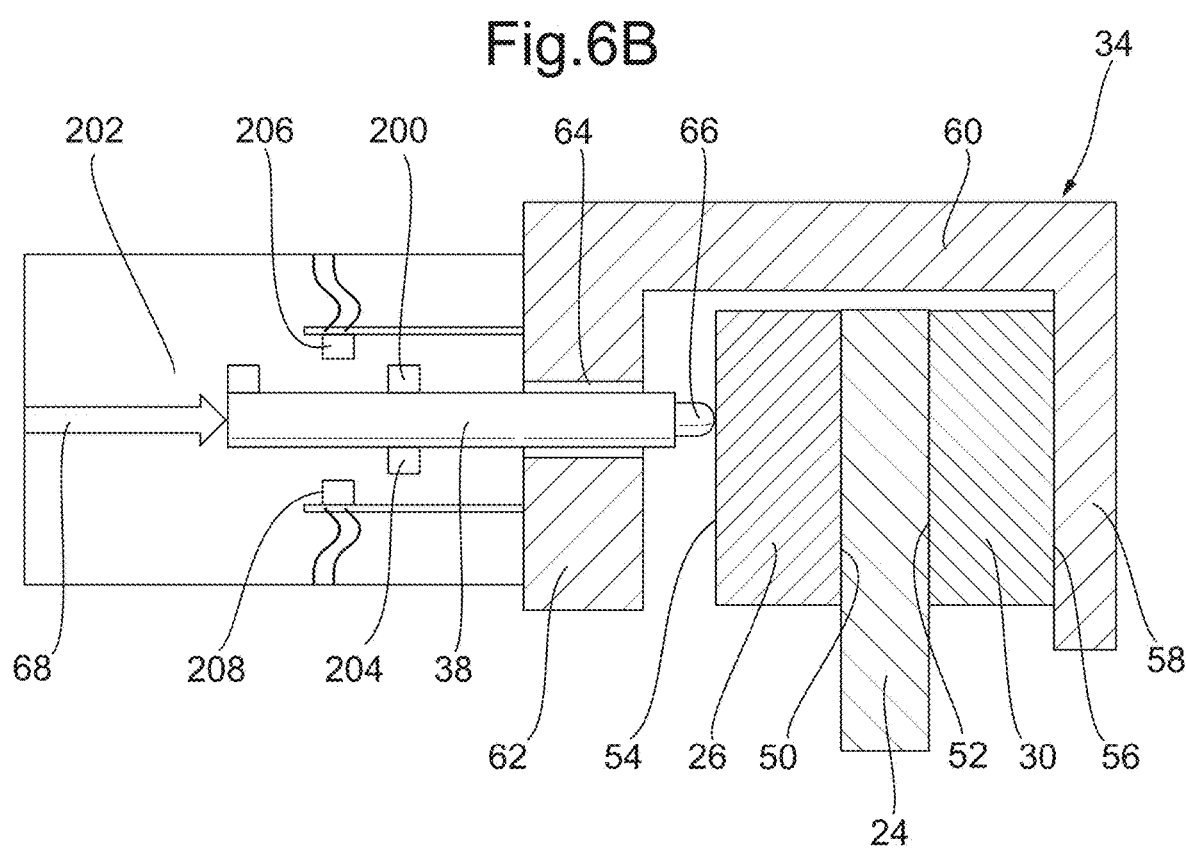

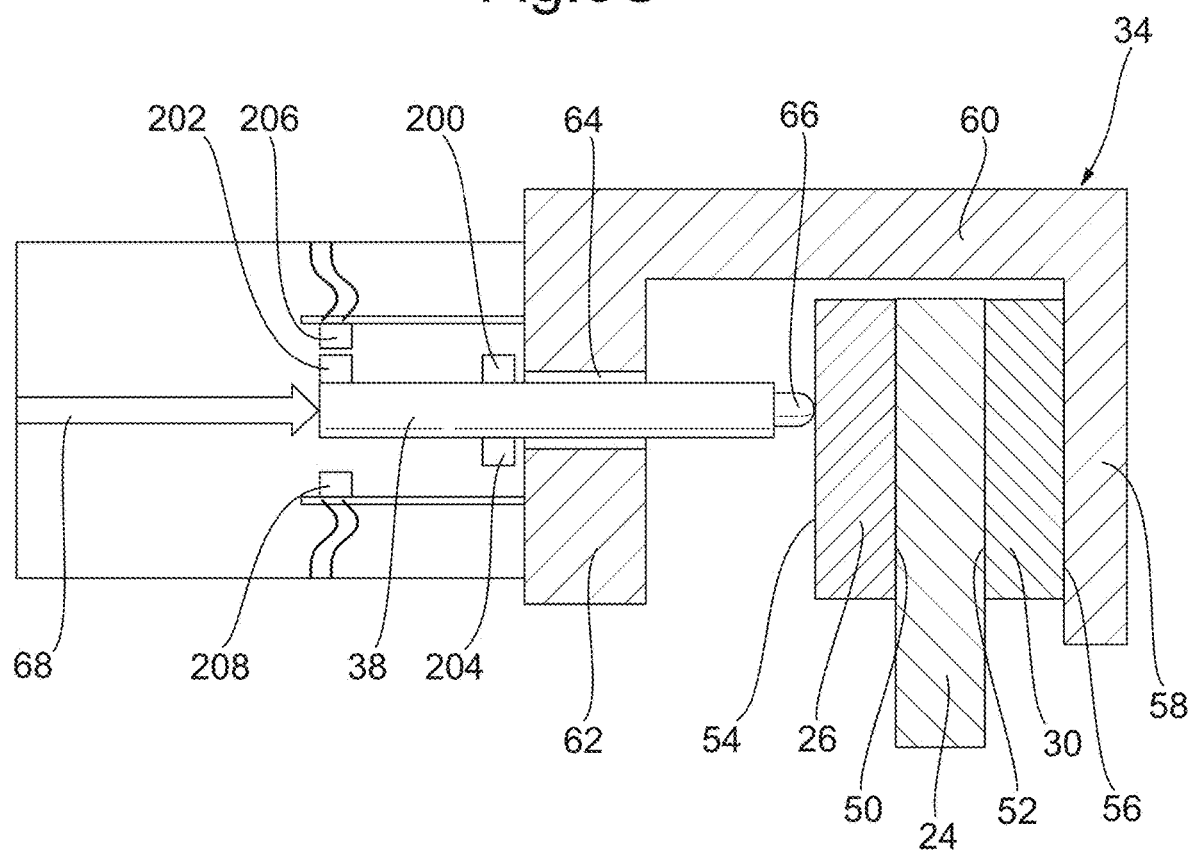

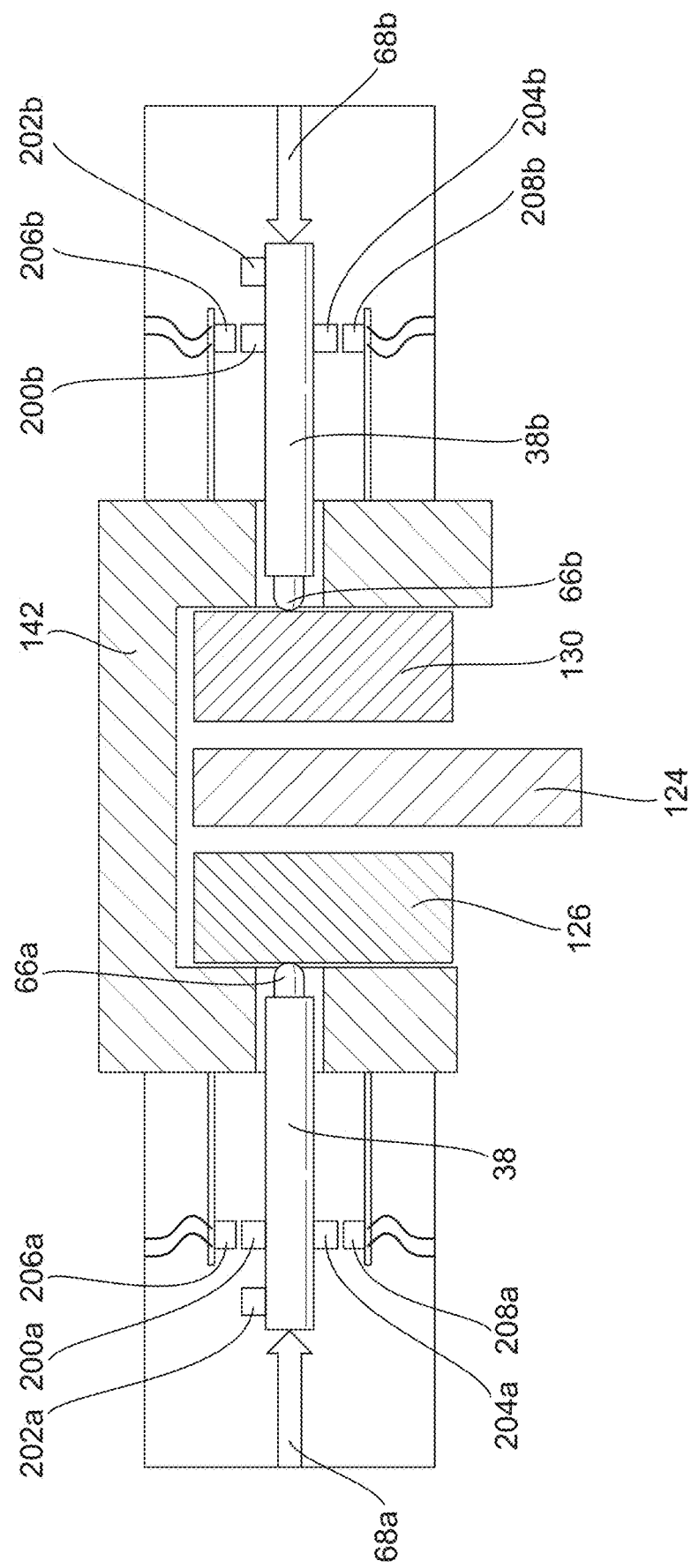

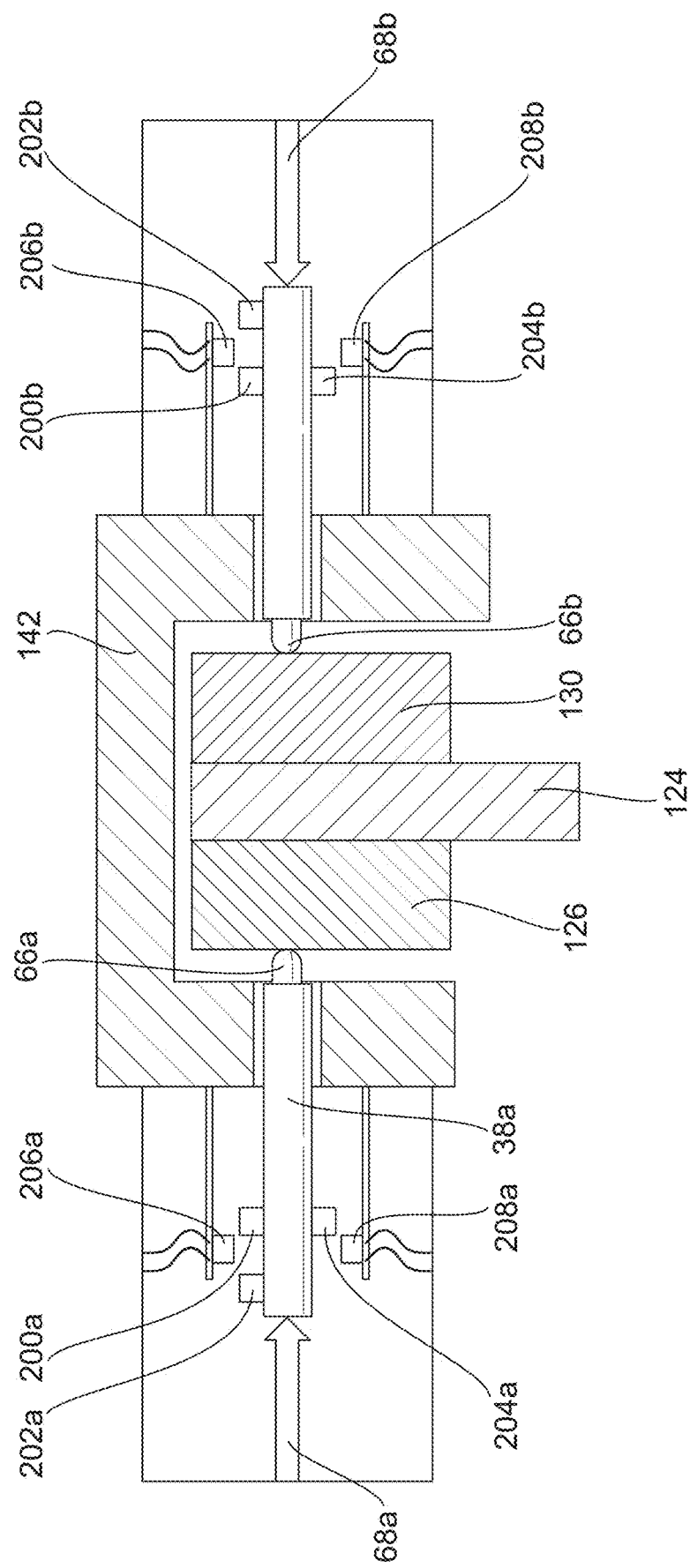

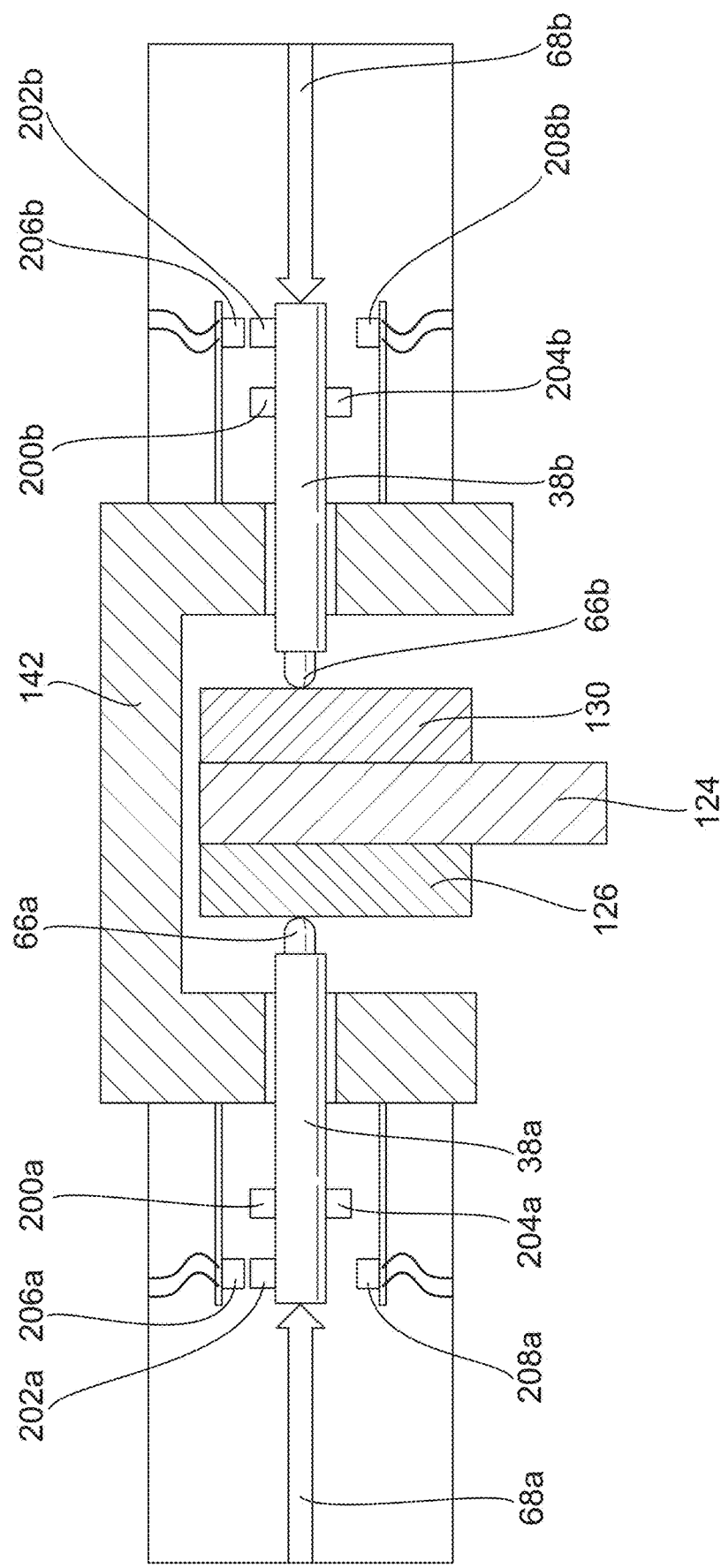

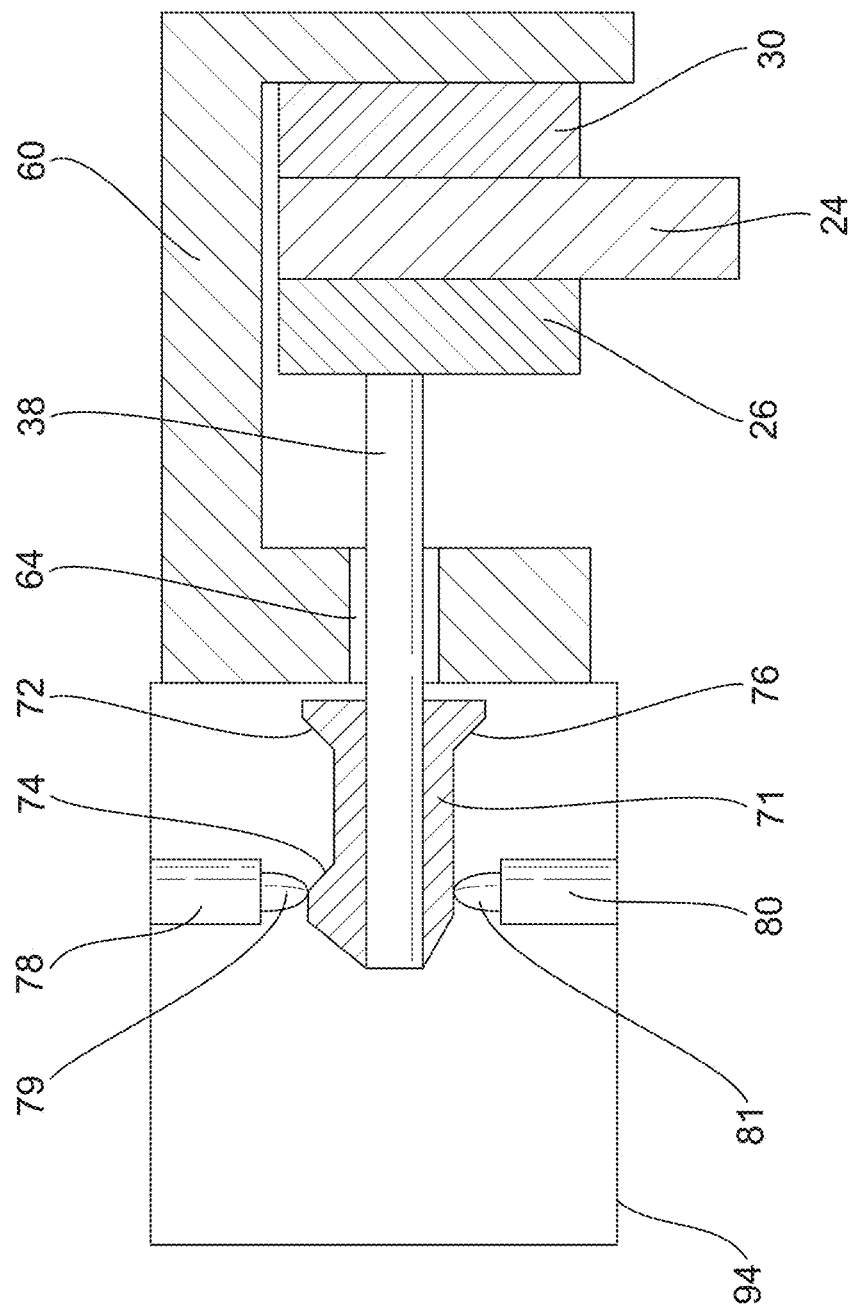

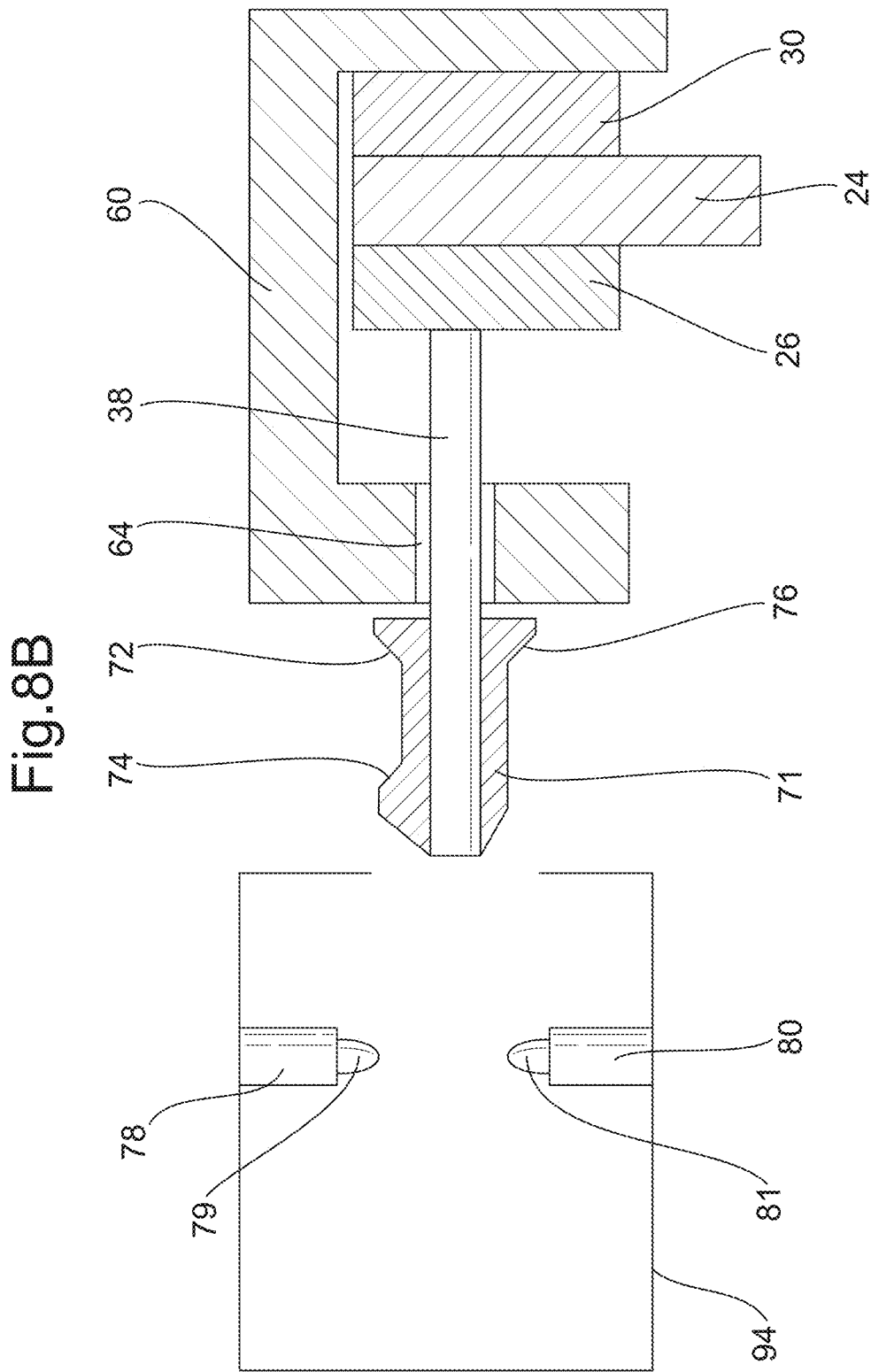

BRAKE MONITORING SYSTEM

FOREIGN PRIORITY

This application claims priority to European Patent Application No. 17306545.9 filed Nov. 8, 2017, the entire contents of which is incorporated herein by reference.

TECHNICAL FIELD

This present disclosure relates to a system and method for monitoring engagement and wear in a brake, and more specifically to a system and method for monitoring engagement and wear in a brake for a rotor, for example an aircraft rotor such as a helicopter rotor.

BACKGROUND

Braking systems in the art typically provide one or more pads which are moved into engagement with a rotating part such as a brake disc to slow or stop the rotation thereof. It is well known that the engagement between the pads and the rotating part causes the thickness of the pads to be worn down over time. Reduction of the pad thickness can lead to failure of the braking system and so it is desirable to monitor the pad thickness and to replace the pads before they reach a desired minimum thickness. When used in a helicopter for example, rotor brakes are often protected by a dust box to prevent the spread of braking debris. This has the disadvantage that the dust box must be removed in order to gain access to the rotor brake.

It would be possible to provide visual indication means for indicating the thickness of the brake pads at any given time through the dust box. However when used in a helicopter, such means would necessitate access to the upper deck of a helicopter to perform a visual check on the brake pads.

Various systems for monitoring wear of brake pads and indicating when maximum wear of the brake pads has been reached have been proposed in the art. An example of this is the system disclosed in U.S. Pat. No. 9,441,692 B2, which includes a wear pin and a switch for signalling that the brake disc stack has worn by a predetermined amount. In some systems however, the switch is not activated until the predetermined amount of wear has been reached. Because of this, a failure in the switch may go undetected until after the brake disc stack has been worn by the predetermined amount, leading to a potential failure of the brake. It will be understood therefore that the known systems for detection of wear in a brake disc stack are vulnerable to dormant or hidden failure.

In addition, heat is generated when the brake pads are in contact with the rotating part. Failure of the brake pads to disengage from the rotating part when the brake is released can cause a significant fire risk. Because of this, it is desirable to monitor the status of the brake to ensure that the brake pads disengage from the rotating part as soon as the brake is released.

The present disclosure seeks to address these challenges.

SUMMARY

From a first aspect, the present disclosure provides a system for monitoring engagement and wear in a brake, the brake comprising: a rotating part defining an axis of rotation; a moveable brake pad located on a first side of the rotating part; and a second brake pad located on a second side of the rotating part. The brake is moveable in use between a released position in which the movable brake pad and the second brake pad do not contact the rotating part, and an engaged position in which the movable brake pad and the second brake pad are in contact with the rotating part. The system includes a pin, wherein the pin is adapted to extend in an axial direction parallel to the axis of rotation, and to be in contact with and to move with the moveable brake pad in use, the system further comprising: a first marker positioned on the pin at a first location; a second marker spaced from the first marker along the pin; and a first fixed sensing arrangement, wherein in use, the first fixed sensing arrangement is adapted to provide a first signal when adjacent the first or second marker, and a second signal when not adjacent the first or second marker. In this aspect, the first and second markers and the first fixed sensing arrangement are positioned such that the second signal indicates that the brake is in the engaged position, and a change from the second signal to the first signal indicates that the moveable brake pad and the second brake pad have been worn down by a predetermined amount.

Thus it will be seen by those skilled in the art that, in accordance with the present disclosure, a single sensing arrangement (the first fixed sensing arrangement) may provide a signal indicating that the brake is in the engaged position (the second signal) and may then subsequently provide a change in signal which indicates that the moveable brake pad and the second brake pad have been worn down by a predetermined amount (typically this may be the maximum allowable amount of wear for safe operation of the brake). Because of this, the system of the present disclosure may be less vulnerable to dormant or hidden failure of the arrangement for sensing maximum allowable wear of the brake pads than the known systems discussed above.

In addition to the above, the system of the present disclosure may indicate both the state of engagement of the brake and whether or not the brake pads have reached their maximum desired or allowable wear. Accordingly, there may not be a need for a separate switch for monitoring whether the brake is in the engaged position or the released position.

The system may further comprise: a third marker positioned on the pin at a third location corresponding to the first location in the axial direction; and a second fixed sensing arrangement adapted to provide a third signal when adjacent the third marker, and a fourth signal when not adjacent the third marker in use, wherein in use, when the brake is in the released position, the first fixed sensing arrangement and the second fixed sensing arrangement provide the first signal and the third signal respectively, when the brake is in the engaged position and the moveable brake pad and the second brake pad have not been worn down by the predetermined amount, the first fixed sensing arrangement and the second fixed sensing arrangement provide the second signal and the fourth signal respectively, and when the brake is in the engaged position and the moveable brake pad and the second brake pad have been worn down by the predetermined amount, the first fixed sensing arrangement and the second fixed sensing arrangement provide the first signal and the fourth signal respectively.

Thus it will be seen by those skilled in the art that, in accordance with this aspect, the system may be configured to allow a user or processor to distinguish between the released position of the brake (when the first and third signals are provided), the engaged position of the brake without the predetermined amount of brake pad wear (when the second and fourth signals are provided) and the engaged position of the brake with the predetermined amount of brake pad wear (when the first and fourth signals are provided).

In any example of the present disclosure, the system may further comprise a spring adapted to push the pin against the movable brake pad. Alternatively, in any example of the present disclosure, the pin may be fixed to the movable brake pad so as to move therewith in use. At least according to some preferred examples of the disclosure, the pin may move linearly in use.

In any example of the present disclosure, the first and third signals may correspond to one of either high or low logic signals, and the second and fourth signals may correspond to the other of the either high or low logic signals. This has the advantage that the signals can more easily be processed using logic circuits.

The first, second and third markers could take many different forms. In one example, the first second and third markers could comprise visible marks such as lines on the surface of the pin and the first and second fixed sensing arrangements could comprise optical sensors. Optionally, in any example of the present disclosure, the first marker may comprise a first protrusion extending outwardly from the pin and perpendicular to the axis of rotation, or a first recess extending into the pin and perpendicular to the axis of rotation. The second marker may comprise a second protrusion extending outwardly from the pin and perpendicular to the axis of rotation, or a second recess extending into the pin and perpendicular to the axis of rotation. The protrusions could be detected by optical sensors. Preferably however, the first fixed sensing arrangement comprises a first switch adapted to switch from a first state to a second state when moved inwardly or outwardly by the first or second protrusion or the first or second recess in use.

Still more preferably, the third marker may comprise a third protrusion extending outwardly from the pin and perpendicular to the axis of rotation, or a third recess extending into the pin and perpendicular to the axis of rotation. Still more preferably, the second fixed sensing arrangement may comprise a second switch adapted to switch from a first state to a second state when moved inwardly or outwardly by the third protrusion or recess in use.

Alternatively, in any examples of the present disclosure, the first and second markers may comprise first and second magnets. Preferably in these examples, the first sensing arrangement may comprise a first Hall Effect sensor.

Still more preferably, the third marker may comprise a third magnet. Still more preferably, the second sensing arrangement may comprise a second Hall Effect sensor.

According to a further aspect of the present disclosure there is provided a brake comprising: a rotating part defining an axis of rotation; a moveable brake pad located on a first side of the rotating part; a second brake pad located on a second side of the rotating part; and a first system for monitoring wear and engagement in the brake. The brake is moveable in use between a released position in which the movable brake pad and the second brake pad do not contact the rotating part, and an engaged position in which the movable brake pad and the second brake pad are in contact with the rotating part. The first system comprises: a pin extending in an axial direction parallel to the axis of rotation, and adapted to be in contact with and to move with the moveable brake pad in use; a first marker positioned on the pin at a first location; a second marker spaced from the first marker along the pin; and a first fixed sensing arrangement.

In use, the first fixed sensing arrangement is adapted to provide a first signal when adjacent the first or second marker, and a second signal when not adjacent the first or second marker, wherein the first and second markers and the first fixed sensing arrangement are positioned such that the second signal indicates that the brake is in the engaged position, and a change from the second signal to the first signal indicates that the moveable brake pad and the second brake pad have been worn down by a predetermined amount.

In some examples of the present disclosure the brake may comprise one movable brake pad and a second fixed brake pad. In other examples of the present disclosure however, the brake may comprise two movable brake pads. The first movable brake pad may be adapted to move in a first axial direction to engage with the rotating part in use and the second movable brake pad may be adapted to move a second axial direction opposite to the first axial direction to engage with the rotating part in use. In these examples, the second brake pad is a movable brake pad and the brake may optionally further comprise a second system for monitoring wear and engagement in the brake, the second system comprising: a pin extending in an axial direction parallel to the axis of rotation, and adapted to be in contact with and to move with the second brake pad in use; a first marker positioned on the pin at a first location; a second marker spaced from the first marker along the pin; and a first fixed sensing arrangement. In use, the first fixed sensing arrangement is adapted to provide a first signal when adjacent the first or second marker, and a second signal when not adjacent the first or second marker. The first and second markers and the first fixed sensing arrangement are positioned such that the second signal indicates that the brake is in the engaged position, and a change from the second signal to the first signal indicates that the moveable brake pad and the second brake pad have been worn down by a predetermined amount.

The first and/or second systems may preferably further comprise: a third marker positioned on the pin at a third location corresponding to the first location in the axial direction; and a second fixed sensing arrangement adapted to provide a third signal when adjacent the third marker, and a fourth signal when not adjacent the third marker in use, wherein in use, when the brake is in the released position, the first fixed sensing arrangement and the second fixed sensing arrangement provide the first signal and the third signal respectively, when the brake is in the engaged position and the moveable brake pad and the second brake pad have not been worn down by the predetermined amount, the first fixed sensing arrangement and the second fixed sensing arrangement provide the second signal and the fourth signal respectively, and when the brake is in the engaged position and the moveable brake pad and the second brake pad have been worn down by a predetermined amount, the first fixed sensing arrangement and the second fixed sensing arrangement provide the first signal and the fourth signal respectively.

In any example of the present disclosure, the first and/or second system may further comprise a spring adapted to push the pin against the movable brake pad. Alternatively, in any example of the present disclosure, the pin may be fixed to the movable brake pad so as to move therewith in use. At least according to some preferred examples of the disclosure, the pin may move linearly in use.

In any example of the present disclosure, the first and third signals may correspond to one of either high or low logic signals, and the second and fourth signals may correspond to the other of the either high or low logic signals.

Optionally, in any example of the present disclosure, the first marker may comprise a first protrusion extending outwardly from the pin and perpendicular to the axis of rotation, or a first recess extending into the pin and perpendicular to the axis of rotation. The second marker may comprise a second protrusion extending outwardly from the pin and perpendicular to the axis of rotation, or a second recess extending into the pin and perpendicular to the axis of rotation. The protrusions could be detected by optical sensors. Preferably however, the first fixed sensing arrangement comprises a first switch adapted to switch from a first state to a second state when moved inwardly or outwardly by the first or second protrusion or the first or second recess in use.

Still more preferably, the third marker may comprise a third protrusion extending outwardly from the pin and perpendicular to the axis of rotation, or a third recess extending into the pin and perpendicular to the axis of rotation. Still more preferably, the second fixed sensing arrangement may comprise a second switch adapted to switch from a first state to a second state when moved inwardly or outwardly by the third protrusion or recess in use.

Alternatively, in any examples of the present disclosure, the first and second markers may comprise first and second magnets. Preferably in these examples, the first sensing arrangement may comprise a first Hall Effect sensor.

Still more preferably, the third marker may comprise a third magnet. Still more preferably, the second sensing arrangement may comprise a second Hall Effect sensor.

According to a further aspect, the present disclosure may provide a method of monitoring engagement and wear in a brake, the brake comprising: a rotating part defining an axis of rotation, the axis of rotation defining an axial direction; a moveable brake pad located on a first side of the rotating part; and a second brake pad located on a second side of the rotating part, the brake being moveable in use between a released position in which the movable brake pad and the second brake pad do not contact the rotating part, and an engaged position in which the movable brake pad and the second brake pad are in contact with the rotating part. The method comprises: providing first and second markers at a fixed spacing from one another in the axial direction; fixing a first sensing arrangement in the axial direction; causing the first and second markers to move with the movable brake pad in the axial direction in use; causing the first sensing arrangement to produce a first signal when the first or second marker is adjacent the first sensing arrangement; and causing the first sensing arrangement to produce a second signal when neither the first or second marker is adjacent the first sensing arrangement, wherein the first and second markers and the first sensing arrangement are positioned such that the second signal indicates that the brake is in the engaged position, and a change from the second signal to the first signal indicates that the moveable brake pad and the second brake pad have been worn down by a predetermined amount.

Preferably, the method further comprises producing a warning signal indicating that the moveable brake pad and the second brake pad have been worn down by a predetermined amount when a change from the second signal to the first signal is identified.

Preferably, the method further comprises producing a warning signal indicating that there may be a sensor failure when the brake is in the engaged position but the second signal is not produced.

According to any example of the present disclosure, the method may further comprise: providing a third marker fixed at a corresponding location to the first marker in the axial direction; fixing a second sensing arrangement in the axial direction; causing the third marker to move with the movable brake pad in the axial direction in use; causing the second sensing arrangement to produce a third signal when the third marker is adjacent the second sensing arrangement; and causing the second sensing arrangement to produce a fourth signal when the third marker is not adjacent the second sensing arrangement. The third marker and the second sensing arrangement are positioned such that in use, when the brake is in the released position, the first fixed sensing arrangement and the second fixed sensing arrangement provide the first signal and the third signal respectively, when the brake is in the engaged position and the moveable brake pad and the second brake pad have not been worn down by the predetermined amount, the first fixed sensing arrangement and the second fixed sensing arrangement provide the second signal and the fourth signal respectively, and when the brake is in the engaged position and the moveable brake pad and the second brake pad have been worn down by a predetermined amount, the first fixed sensing arrangement and the second fixed sensing arrangement provide the first signal and the fourth signal respectively.

According to any example of the present disclosure, the method may further comprise processing the signals provided to determine the status of the brake. The determined status of the brake may then be communicated to a user (for example a pilot or maintenance personnel) by a display or other means. In one preferred example, the display may show when the brake is in the release position and/or when the brake is in the engaged position. The display may additionally or alternatively show whether the brake pads have been worn down by the predetermined amount.

Features of any example described herein may, wherever appropriate, be applied to any other examples of the present disclosure. Where reference is made to different examples, it should be understood that these are not necessarily distinct but may overlap.

DETAILED DESCRIPTION

One or more non-limiting examples will now be described, by way of example only, with reference to the accompanying drawings in which:

FIG. 2B is a schematic cross sectional view of a rotor brake and a system for monitoring engagement and wear of the rotor brake according to a further example of the present disclosure;

FIG. 3A is a schematic cross sectional view of a system for monitoring engagement and wear of a rotor brake according to an example of the present disclosure when the rotor brake is in the released position;

FIG. 3B is a schematic cross sectional view of the system of FIG. 3A when the rotor brake is in the engaged position; and FIG. 3C is a schematic cross sectional view of the system of FIG. 3A when the rotor brake is in the engaged position and the brake pads have been worn down to their minimum allowable thickness;

FIG. 4 shows the signals produced by the first and second switches of the system of FIGS. 3A to 3D depending on the position of the movable brake pad;

FIG. 5A is a schematic cross sectional view of a system for monitoring engagement and wear of a rotor brake according to another example of the present disclosure when the rotor brake is in the released position;

FIG. 5C is a schematic cross sectional view of the system of FIG. 5A when the rotor brake is in the engaged position and the brake pads have been worn down to their minimum allowable thickness;

FIG. 6A is a schematic cross sectional view of a system for monitoring engagement and wear of a rotor brake according to another example of the present disclosure when the rotor brake is in the released position;

FIG. 6B is a schematic cross sectional view of the system of FIG. 6A when the rotor brake is in the engaged position; and FIG. 6C is a schematic cross sectional view of the system of FIG. 6A when the rotor brake is in the engaged position and the brake pads have been worn down to their minimum allowable thickness;

FIG. 7A is a schematic cross sectional view of a system for monitoring engagement and wear of a rotor brake according to another example of the present disclosure when the rotor brake is in the released position;

FIG. 7B is a schematic cross sectional view of the system of FIG. 7A when the rotor brake is in the engaged position; and FIG. 7C is a schematic cross sectional view of the system of FIG. 7A when the rotor brake is in the engaged position and the brake pads have been worn down to their minimum allowable thickness;

FIG. 8A is a schematic cross sectional view of a system for monitoring engagement and wear of a rotor brake according to an alternative example of the present disclosure when the rotor brake is in the engaged position and the brake pads have been worn down to their minimum allowable thickness;

FIG. 8B is a schematic cross sectional view of the system of FIG. 8A showing removal of a part thereof.

DETAILED DESCRIPTION

Figure 1:
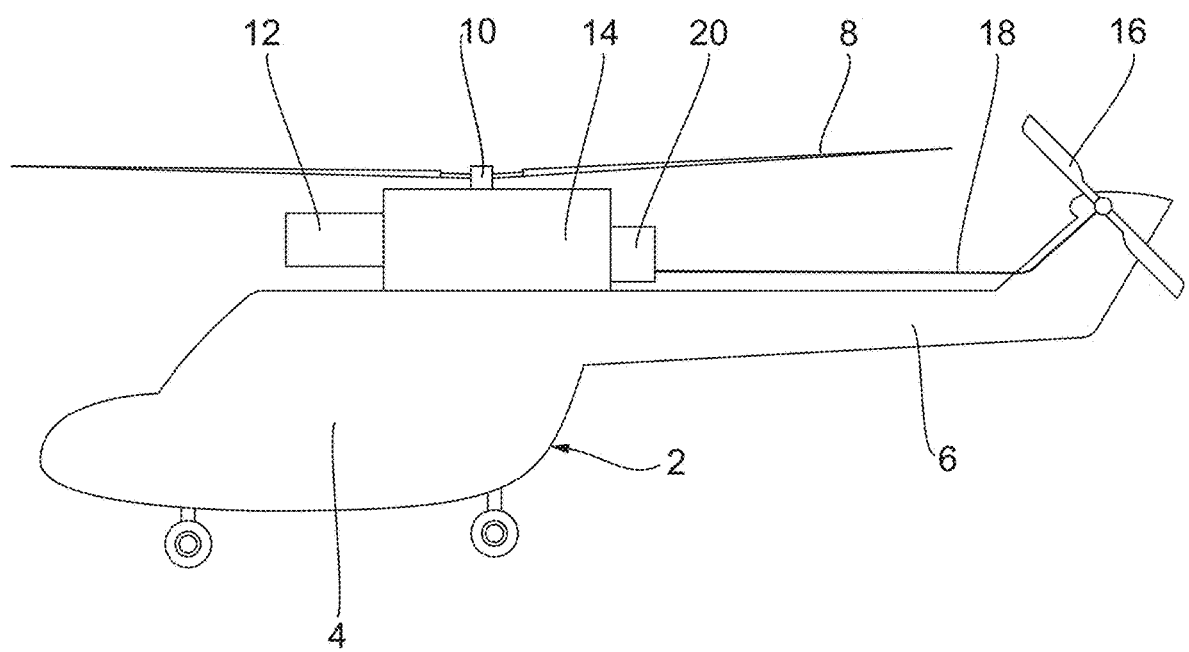
FIG. 1 is a schematic cross section through a helicopter according to examples typical of the prior art.

FIG. 1 shows a helicopter according to examples typical of the prior art. It will be appreciated that some of the parts in FIG. 1 are not shown to scale. The helicopter comprises a body 2 having a cabin 4 therein. A tail 6 extends rearward from the body 2. A rotor 8 is provided above the body 2 and rotates about a shaft 10 extending vertically upwardly from the body 2. The rotor 8 is driven by a motor 12 via a main gear box 14.

A tail rotor 16 is provided at the end of tail 6 and is adapted to rotate about a substantially horizontal axis. The tail rotor 16 is driven by the motor 12 via the main gear box 14 and a tail rotor shaft 18 which extends from the main gear box 14 to the tail rotor 16. As is known in the art, a rotor brake 20 is provided on the tail rotor shaft 18 adjacent the main gear box 14.

Figure 2A:
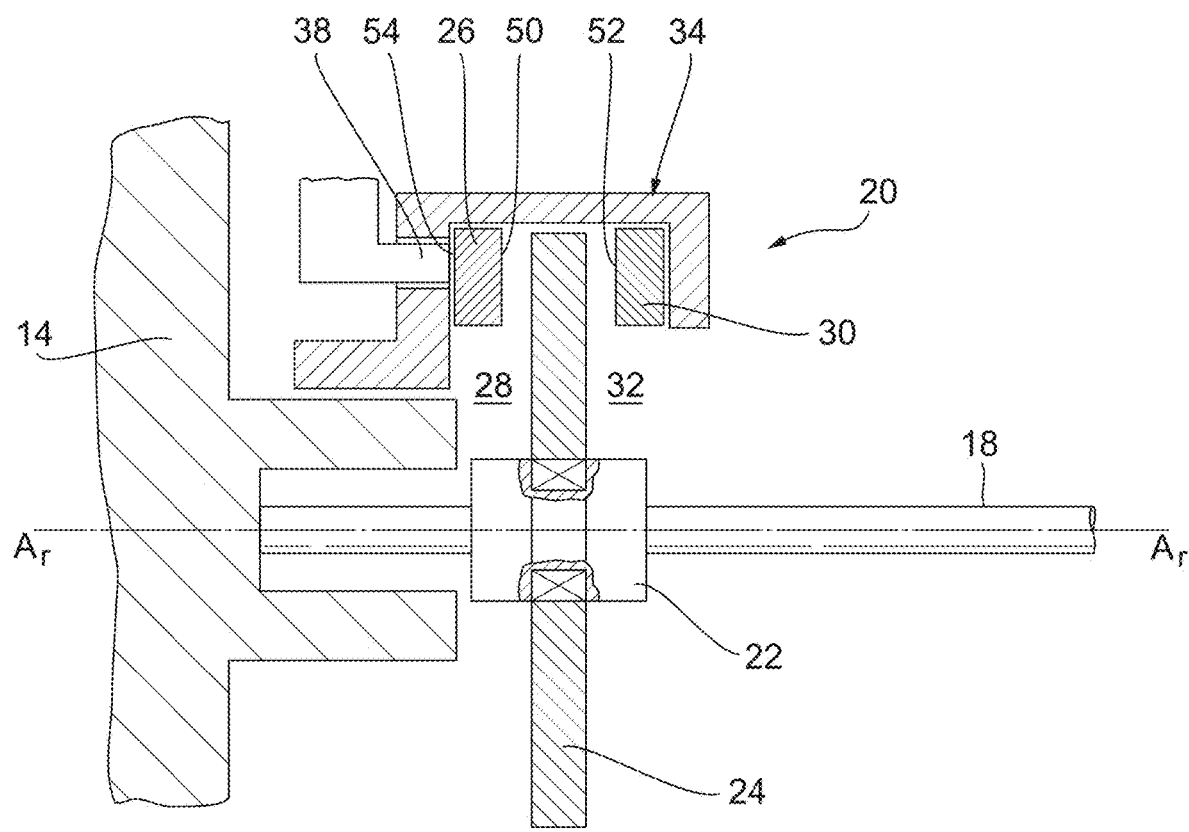
FIG. 2A is a schematic cross sectional view of a first example of a rotor brake and a system for monitoring engagement and wear of the rotor brake according to a first example of the present disclosure.

As seen in FIG. 2A, in one example, the rotor brake 20 comprises a spline shaft 22 extending around and adapted to rotate with the tail rotor shaft 18 about an axis of rotation $A_r$ defined by the tail rotor shaft. The spline shaft 22 is further adapted to slide telescopically on the tail rotor shaft 18. A rotor brake floating disc 24 (or rotating part) is mounted on the spline shaft 22 so as to extend perpendicular thereto and rotate therewith about the axis of rotation $A_r$ (the axis of rotation $A_r$ defining an axial direction extending parallel thereto and a radial direction extending perpendicular thereto). In the example shown in FIG. 2A, the rotor brake 20 comprises a first brake pad 26 provided on a first axial side 28 of the rotor brake floating disc 24 and a second brake pad 30 provided on a second axial side 32 of the rotor brake floating disc 24 opposite the first brake pad 26. In the example shown, the first brake pad 26 is moveable in the axial direction and the second brake pad 30 is fixed. A calliper 34 extends over the first and second brake pads 26, 30. Actuation means (not shown) are provided to cause the first brake pad 26 to move so as engage or release the brake in use. The actuation means can comprise hydraulic or electric actuators as is known in the art.

In use, the first brake pad 26 is moved towards the tail rotor 16 until the rotor brake floating disc 24 is engaged with an inner surface 50, 52 of both the first brake pad 26 and the second brake pad 30. In this position (the engaged position), the brake pads act to slow and/or stop rotation of the rotor brake floating disc 24. It will be understood that the rotor brake 20 is released (or in the released position) when the rotor brake floating disc 24 is not engaged with the inner surfaces 50, 52 of the first and second brake pads 26, 30.

The friction between the brake pads 26, 30 and the rotor brake floating disc 24 when in the engaged position causes the brake pads 26, 30 to be worn down over time. A system for monitoring engagement and wear in a rotor disc brake 20, according to a first example of the present disclosure is shown schematically in FIG. 2A. As seen, the system includes a pin 38 extending parallel to the axis of rotation $A_r$ from the moveable (first) brake pad 26 towards the main gear box 14. The pin 38 is adapted to move with the first brake pad 26 and to be in constant contact with an outer surface 54 thereof. As the first and second brake pads 26, 30 are worn down, the outer surface 54 of the first break pad 26 will move in the direction of the tail rotor 16. It will be appreciated that in the example of FIG. 2A, the rotor disc brake 20 comprises one fixed brake pad and one moveable brake pad and that, in this configuration, the system for monitoring engagement and wear in the rotor disc brake 20 comprises only a single pin 38 adapted to move with the first (moveable) brake pad 26. The system will be described in further detail below.

FIG. 2B shows a rotor brake and a system for monitoring engagement and wear of the rotor brake according to another example of the present disclosure. In this example, the rotor brake 120 comprises a rotor brake disc 124 fixed to the tail rotor shaft 118 so as to rotate therewith about the axis of rotation $A_r$. As shown, the rotor brake disc 124 may be fixed to an annular flange 144 formed integrally with the tail rotor shaft 118 and extending outwardly therefrom so as to overlap with the rotor brake disc 124. The rotor brake disc 124 may be fixed to the annular flange 144 by bolts 146 passing through the annular flange 144 and the rotor brake disc 124. In the example shown in FIG. 2B, the rotor brake 120 comprises a first brake pad 126 provided on a first axial side 128 of the rotor brake disc 124 and a second brake pad 130 provided on a second axial side 132 of the rotor brake disc 124 opposite the first brake pad 126. In the example shown, the first and second brake pads 126, 130 are moveable parallel to the axis of rotation $A_r$. A calliper 142 extends over the first and second brake pads 126, 130 such that they cannot move apart from one another by more than a predetermined distance. Actuation means (not shown) are provided to cause the first brake pad 126 to move so as engage or release the brake. The actuation means can comprise hydraulic or electric actuators as is known in the art. In use, the first and second brake pads 126, 130 are moved towards one another until the rotor brake disc 124 is engaged with an inner surface 150, 152 of both the first brake pad 126 and the second brake pad 130. In this position (the engaged position), the brake pads 126, 130 act to slow and/or stop rotation of the rotor brake disc 124. It will be understood that the rotor brake 120 is released (or in the released position) when the rotor brake disc 124 is not engaged with the inner surfaces 150, 152 of the first and second brake pads 126, 130.

The problem of the brake pads being worn down over time as described above in relation to the example of FIG. 2A may also occur in the example of FIG. 2B. A system for monitoring engagement and wear in a rotor disc brake 120, according to a further example of the present disclosure is shown schematically in FIG. 2B. As seen, the system includes a pin 138 extending parallel to the axis of rotation $A_r$ from the first brake pad 126 towards the main gear box 14. The pin 138 is adapted to move with the first brake pad 126 and to be in constant contact with an outer surface 154 thereof. The system further comprises a pin 148 extending parallel to the axis of rotation $A_r$ from the second brake pad 130 towards the tail rotor 16. The pin 148 is adapted to move with the second brake pad 130 and to be in constant contact with an outer surface 156 thereof. It will be appreciated that in the example of FIG. 2B, the rotor disc brake 120 comprises two moveable brake pads and that, in this configuration, the system for monitoring engagement and wear in the rotor disc brake 120 comprises two pins 138, 148 adapted to move with the respective moveable brake pads 126, 130. As the first and second brake pads 26, 30 are worn down, the outer surface 54 of the first break pad 26 and the outer surface 156 of the second break pad 30 will move towards one another. The system will be described in further detail below.

FIG. 3A shows a system for monitoring engagement and wear of a rotor brake according to an example of the present disclosure in a rotor brake 20 of the type shown in FIG. 2A, i.e. having one fixed brake pad (second brake pad 30) and one moveable brake pad (first brake pad 26). As seen in FIG. 3A, the calliper 34 is substantially U-shaped, having a first wall 58 extending adjacent and parallel to the outer surface 56 of the second brake pad 30. A second wall 60 extends perpendicular to the first wall 58 from a first end thereof so as to extend over the second brake pad 30, the rotor brake floating disc 24 and the first brake pad 26. A third wall 62 extends from the second wall 60 parallel to the first wall 58 and adjacent to the outer surface 54 of the first brake pad 26. An aperture 64 extends through the third wall 62 so as to be level with part of the outer surface 54 of the first brake pad 26.

The system for monitoring engagement and wear in the rotor disc brake 20, comprises a spring loaded pin 38 extending parallel to the axis of rotation $A_r$, through the aperture 64. A first end 66 of the pin 38 is adapted to be in constant contact with the outer surface 54 of the first brake pad 26. This is achieved by means of a spring 68 pushing the second end 70 of the pin 38 towards the first brake pad 26. Markers are provided on the pin 38 and engage with fixed sensing arrangements so as to determine the position of the outer surface 54 of the first brake pad 26 relative to the fixed sensing arrangements.

In the example of FIGS. 3A to 3C, the fixed sensing arrangements comprise a first switch 78 and a second switch 80. The first and second switches 78, 80 are positioned radially opposite one another on the pin 38 and are fixed so that they do not move in the axial direction. It will be appreciated that the first and second switches 78, 80 need not be positioned radially opposite one another but could be positioned in any radial orientation which allowed them to achieve their required function.

The markers comprise first, second and third protrusions 72, 74, 76 extending radially outwardly from the pin 38 and provided on a sleeve 71 extending around the pin 38 from the second end 70 thereof to the sides of the first 72 and third 76 protrusions nearest to the first end 66 of the pin 38. The first protrusion 72 is positioned so as to coincide with and activate the first switch 78 when the rotor brake 20 is in the released position. The third protrusion 76 is positioned on the radially opposite side of the pin 38 from the first protrusion 72 and is positioned so as to coincide with and activate the second switch 80 when the rotor brake 20 is in the release position. It will be appreciated that the third protrusion 76 need not be positioned radially opposite the first protrusion 72 but could be positioned in any radial orientation at a corresponding axial position to the first protrusion 72 which allowed it to coincide with and activate the second switch 80 when the rotor brake 20 was in the release position. The second protrusion 74 extends from the second end 70 of the pin 38 in the same direction as the first protrusion 72 and is positioned to coincide with and activate the first switch 78 when the first and second brake pads 26, 30 have been worn down to their minimum allowable thickness, i.e. to their maximum allowable wear condition.

The first and second switches 78, 80 comprise spring loaded switching parts 79, 81 which extend radially towards the pin 38 and which are adapted to be activated by being pushed radially outwardly by the respective protrusions 72, 74, 76 with which they come into contact.

The first protrusion 72 comprises a first portion 82 extending radially outwardly from the sleeve 71 and having an outer surface which is at a constant radial distance from the sleeve 71. The first protrusion 72 further comprises a chamfered portion 84 extending from the outer surface of the first portion 82 to an outer surface of the sleeve 71 towards the second end 70 of the pin 38. The chamfered portion 84 may allow the spring loaded switch part 79 of the first switch 78 to move smoothly along the surface of the chamfered portion 84 as it moves radially inwardly before engaging with the outer surface of the sleeve 71 as the pin 38 moves towards the second brake pad 30.

The second protrusion 74 comprises a first portion 86 extending radially outwardly from the sleeve 71 at the second end 70 of the pin 38. The first portion 86 has an outer surface which is at a constant radial distance from the sleeve 71. The second protrusion 74 further comprises a chamfered portion 88 extending from the outer surface of the first portion 86 to an outer surface of the sleeve 71 towards the first end 66 of the pin 38. The chamfered portion 84 may allow the spring loaded switch part 79 of the first switch 78 to move smoothly along the surface of the chamfered portion 84 as it moves radially outwardly from the outer surface of the sleeve 71 as the pin 38 moves towards the second brake pad 30.

The third protrusion 76 comprises a first portion 90 extending radially outwardly from the sleeve 71 radially opposite and axially aligned with the first protrusion 72. The first portion 90 has an outer surface which is at a constant radial distance from the sleeve 71. The third protrusion 76 further comprises a chamfered portion 92 extending from the outer surface of the first portion 90 to an outer surface of the sleeve 71 towards the second end 70 of the pin 38. The chamfered portion 92 may allow the spring loaded switch part 81 of the second switch 80 to move smoothly along the surface of the chamfered portion 92 radially inwardly before engaging with the outer surface of the sleeve 71 as the pin 38 moves towards the second brake pad 30.

FIG. 3A shows the position of the protrusions 72, 74, 76 relative to the switches 78, 80 when the rotor brake 20 is in the released position. As can be seen, the first switch 78 is engaged with the outer surface of the first portion 82 of the first protrusion 72 such that the spring loaded switching part 79 thereof is pushed radially outwardly by the first protrusion 72. In this position, the first switch 78 is configured to provide a high logic signal (e.g. a binary 1 signal).

The second switch 80 is engaged with the outer surface of the first portion 90 of the third protrusion 76 such that the spring loaded switching part 81 thereof is pushed radially outwardly by the third protrusion 76. In this position, the second switch 80 is also configured to provide a high logic signal (e.g. a binary 1 signal).

FIG. 3B shows the position of the protrusions 72, 74, 76 relative to the switches 78, 80 when the rotor brake 20 is in the engaged position but when the first and second brake pads 26, 30 have not yet reached their maximum allowable wear condition. In this position first switch 78 is engaged with the outer surface of the sleeve 71 such that the spring loaded switching part 79 thereof is not pushed radially outwardly. Thus, the first switch 78 provides a low logic signal in this position (e.g. a binary 0 signal).

The second switch 80 is also engaged with the outer surface of the sleeve 71 such that the spring loaded switching 81 part thereof is not pushed radially outwardly in this position. Thus, the second switch 80 also provides a low logic signal (e.g. a binary 0 signal).

FIG. 3C shows the position of the protrusions 72, 74, 76 relative to the switches 78, 80 when the rotor brake 20 is in the engaged position when the first and second brake pads 26, 30 have also reached their maximum allowable wear condition. As can be seen, the first switch 78 is engaged with the outer surface of the first portion 82 of the first protrusion 72 such that the spring loaded switching 79 part thereof is pushed radially outwardly by the first protrusion 72. Thus, the first switch 78 provides a high logic signal (e.g. binary 1).

In this position, the second switch 80 is engaged with the outer surface of the sleeve 71 such that the spring loaded switching part 81 thereof is not pushed radially outwardly. Thus, the second switch 80 provides a low logic signal (e.g. binary 0).

Figure 3D:
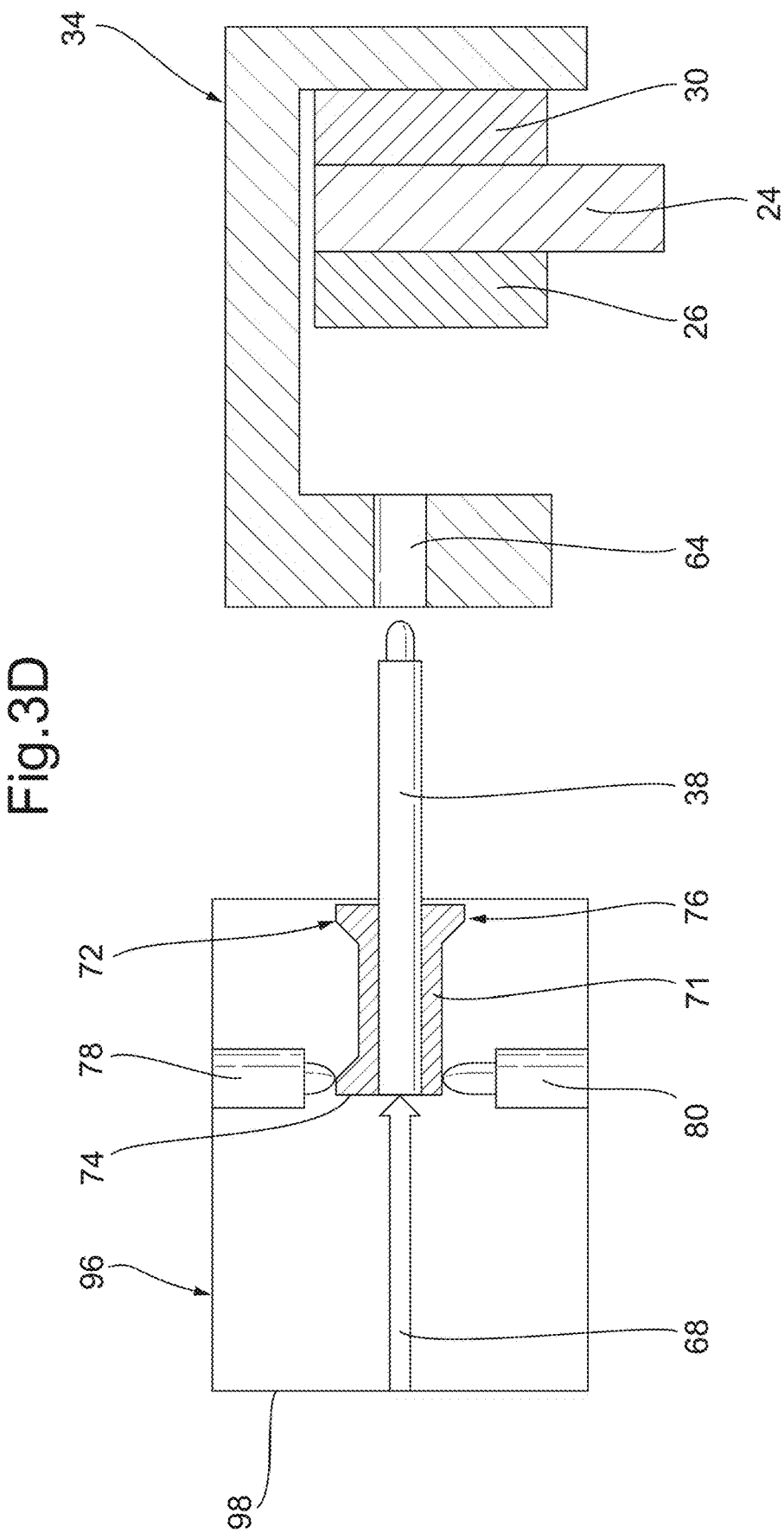
FIG. 3D is a schematic cross sectional view of the system of FIG. 3A when the rotor brake is in the engaged position and the brake pads have been worn down to their minimum allowable thickness, showing the system being removed from the rotor brake disc.

FIG. 3D is a schematic cross sectional view of the system for monitoring engagement and wear of a rotor brake 20 as shown in FIG. 3C. As seen in FIG. 3D, at least in some examples of the present disclosure, the system can be manufactured as a separate module 96 comprising a housing 98, in which the spring 68, the first and second switches 78, 80, the pin 38, the sleeve 71 and the first, second and third protrusions 72, 74, 76 are provided. This has the advantage that the module 96 can be easily removed for maintenance and/or replacement. It will be appreciated that any of the various examples described herein can be provided in a removable module so as to give these advantages.

FIG. 4 is a graphical representation of the signals output from the first and second switches 78, 80 depending on the position of the outer surface 54 of the movable brake pad 26 in one example according to the present disclosure. The axis (x) shows the pad position in mm, where $P_r$ (0 mm in one example) corresponds to the position of the outer surface 54 of the movable brake pad 26 when the brake is in the released position and $P_{mw}$ (17 mm in one example) corresponds to the position of the outer surface 54 of the movable brake pad 26 when the pads have reached their maximum wear condition.

As shown, the first switch (shown by line 102) provides a high logic signal at $P_r$, which falls to a low logic signal after the brake has moved to the engaged position and then remains as a low logic signal until reaching $P_{mw}$, where it reverts to a high logic signal. The second switch (shown by line 104) provides a high logic signal at $P_r$, which falls to a low logic signal after the brake has moved to the engaged position and then remains as a low logic signal until beyond $P_{mw}$. As discussed above, the example of FIGS. 3A to 3C relates to a rotor brake 20 having one fixed brake pad and one moveable brake pad. FIG. 2B shows an alternative example of a rotor brake having two moveable brake pads. In this example, the system for monitoring engagement and wear in the rotor disc brake 120 may have a first spring loaded pin 38*a* (shown in FIGS. 5A to 5C) engaging with the first brake pad 126 and a second spring loaded pin 38*b* (shown in FIGS. 5A to 5C) engaging with the second brake pad 130. Thus, the first pin 38*a* extends axially away from the outer surface 154 of the first brake pad 126 in a first axial direction and the second pin 38*b* extends axially away from the outer surface 156 of the second brake pad 130 in a second axial direction opposite to the first axial direction.

Figure 5B:
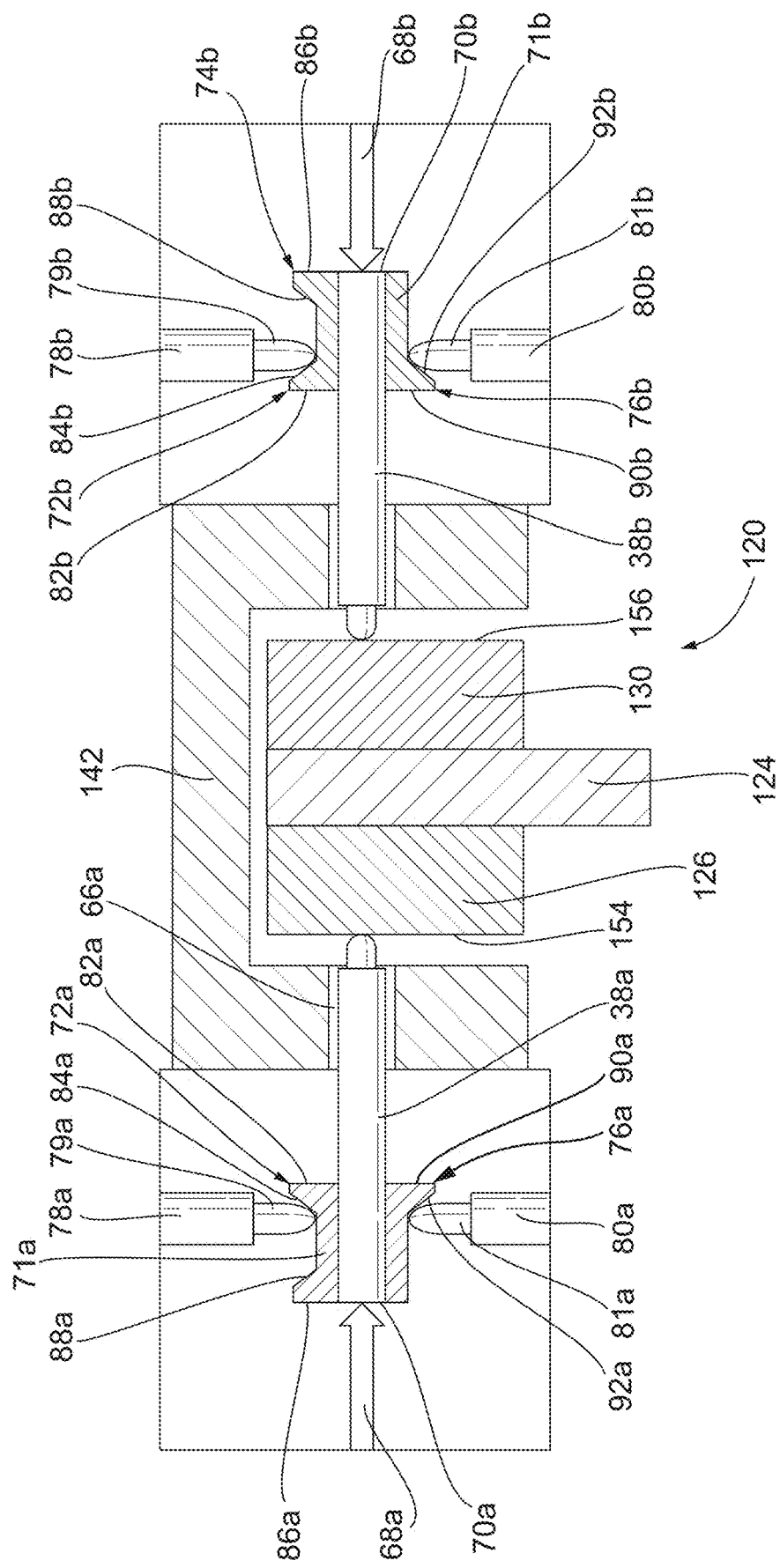
FIG. 5B is a schematic cross sectional view of the system of FIG. 5A when the rotor brake is in the engaged position.

In the example of FIGS. 5A to 5C, first and second sensing arrangements are provided, each comprising a first switch 78*a*, 78*b* and a second switch 80*a*, 80*b*. The first and second switches 78*a*, 78*b*, 80*a*, 80*b* are positioned radially opposite one another for the respective pins 38*a*, 38*b* and are fixed so as not to move in the axial direction. It will be appreciated that as for the example of FIGS. 3A to 3D, the switches 78*a*, 78*b*, 80*a*, 80*b* could be positioned in any radial orientation which allowed them to achieve their required function.

Markers are provided for both the first and second pins 38*a*, 38*b*. The markers on the first pin 38*a* and the second pin 38*b* comprise respective first, second and third protrusions 72*a*, 72*b*, 74*a*, 74*b*, 76*a*, 76*b* extending radially outwardly from the respective pins 38*a*, 38*b* and provided on respective sleeves 71*a*, 71*b* extending around the pins 38*a*, 38*b* from the respective second ends 70*a*, 70*b* thereof to the sides of the respective first 72*a*, 72*b* and third 76*a*, 76*b* protrusions nearest to the first respective ends 66*a*, 66*b* of the first and second pins 38*a*, 38*b*. The first protrusions 72*a*, 72*b* are positioned so as to coincide with and activate the first switches 78*a*, 78*b* when the rotor brake 120 is in the released position. The third protrusions 76*a*, 76*b* are positioned on the radially opposite side of the pins 38*a*, 38*b* from the first protrusions 72*a*, 72*b* and are positioned so as to coincide with and activate the second switches 80*a*, 80*b* when the rotor brake 120 is in the released position. The second protrusions 74*a*, 74*b* extend from the respective second ends 70*a*, 70*b* of the pins 38*a*, 38*b* in the same direction as the first protrusions 72*a*, 72*b* and are positioned to coincide with and activate the first switches 78*a*, 78*b* when the first and second brake pads 126, 130 have been worn down to their minimum allowable thickness, i.e. to their maximum allowable wear condition.

The first and second switches 78*a*, 78*b*, 80*a*, 80*b* comprise spring loaded switching parts 79*a*, 79*b*, 81*a*, 81*b* which extend radially towards the pins 38*a*, 38*b* and which are adapted to be activated by being pushed radially outwardly by the respective protrusions 72*a*, 72*b*, 74*a*, 74*b*, 76*a*, 76*b* with which they come into contact.

The respective first, second and third protrusions 72*a*, 72*b*, 74*a*, 74*b*, 76*a*, 76*b* have respective first portions 82*a*, 82*b*, 86*a*, 86*b*,90*a*, 90*b* and respective chamfered portions 84*a*, 84*b*, 88*a*, 88*b*, 92*a*, 92*b* which function as in the example of FIGS. 3A to 3C.

FIG. 5A shows the position of the protrusions 72*a*, 72*b*, 74*a*, 74*b*, 76*a*, 76*b* relative to the switches 78*a*, 78*b*, 80*a*, 80*b* when the rotor brake 120 is in the released position. As can be seen, the first switches 78*a*, 78*b* are engaged with the outer surfaces of the first portions 82*a*, 82*b* of the first protrusions 72*a*, 72*b* such that the spring loaded switching parts 79*a*, 79*b* of the first switches 78*a*, 78*b* are pushed radially outwardly by the first protrusions 72*a*, 72*b*. In this position, the first switches 78*a*, 78*b* are configured to provide a high logic signal (e.g. a binary 1 signal).

The second switches 80*a*, 80*b* are engaged with the outer surfaces of the first portions 90*a*, 90*b* of the third protrusions 76*a*, 76*b* such that the spring loaded switching parts 81*a*, 81*b* of the second switches 80*a*, 80*b* are pushed radially outwardly by the third protrusions 76*a*, 76*b*. In this position, the second switches 80*a*, 80*b* are also configured to provide a high logic signal (e.g. a binary 1 signal).

FIG. 5B shows the position of the protrusions 72*a*, 72*b*, 74*a*, 74*b*, 76*a*, 76*b* relative to the switches 78*a*, 78*b*, 80*a*, 80*b* when the rotor brake 120 is in the engaged position but when the first and second brake pads 126, 130 have not yet reached their maximum allowable wear condition. In this position, the first switches 78*a*, 78*b* are engaged with the outer surfaces of the sleeves 71*a*, 71*b* such that the spring loaded switching parts 79*a*, 79*b* of the first switches 78*a*, 78*b* are not pushed radially outwardly. Thus, the first switches 78*a*, 78*b* provide a low logic signal in this position (e.g. a binary 0 signal).

The second switches 80*a*, 80*b* are also engaged with the outer surfaces of the sleeves 71*a*, 71*b* such that the spring loaded switching parts 81*a*, 81*b* of the second switches 80*a*, 80*b* are not pushed radially outwardly in this position. Thus, the second switches 80*a*, 80*b* also provide a low logic signal (e.g. a binary 0 signal).

FIG. 5C shows the position of the protrusions 72*a*, 72*b*, 74*a*, 74*b*, 76*a*, 76*b* relative to the switches 78*a*, 78*b*, 80*a*, 80*b* when the rotor brake 120 is in the engaged position and when the first and second brake pads 126, 130 have also reached their maximum allowable wear condition. As can be seen, the first switches 78*a*, 78*b* are engaged with the outer surfaces of the first portions 82*a*, 82*b* of the first protrusions 72*a*, 72*b* such that the spring loaded switching parts 79*a*, 79*b* of the first switches 78*a*, 78*b* are pushed radially outwardly by the first protrusions 72*a*, 72*b*. Thus, the first switches 78*a*, 78*b* provide a high logic signal (e.g. binary 1).

In this position, the second switches 80*a*, 80*b* are engaged with the outer surfaces of the sleeves 71*a*, 71*b* such that the spring loaded switching parts 81*a*, 81*b* of the second switches 80*a*, 80*b* are not pushed radially outwardly. Thus, the second switches 80*a*, 80*b* provide a low logic signal (e.g. binary 0). In the examples shown in FIGS. 3A to 3C and 5A to 5C, the markers are provided by the protrusions 72, 72*a*, 72*b*, 74, 74*a*, 74*b*, 76, 76*a*, 76*b* and the sensing arrangement is provided by the first and second switches 78, 78*a*, 78*b*, 80, 80*a*, 80*b*. In alternative examples, each of the protrusions 72, 72*a*, 72*b*, 74, 74*a*, 74*b*, 76, 76*a*, 76*b* may be replaced by a respective magnet (200, 202, 204 shown in FIGS. 6A to 6C) positioned in substantially the same location as the respective protrusions 72, 72*a*, 72*b*, 74, 74*a*, 74*b*, 76, 76*a*, 76*b*. The first switch 78, 78*a*, 78*b* may be replaced by a first Hall Effect sensor 206 in substantially the same location and the second switch 80, 80*a*, 80*b* may be replaced by a second Hall Effect sensor 208 in substantially the same location.

FIGS. 6A to 6C show a system for monitoring engagement and wear of a rotor brake corresponding to the system of FIG. 3A to 3C but in which the protrusions, 72, 74, 76 have been replaced by magnets 200, 202, 204. The first and second switches 78, 80 have been replaced by respective Hall Effect sensors 206, 208. All elements having reference numbers corresponding to the reference numbers of FIGS. 3A to 3C are identical thereto.

In use, when the rotor disc brake 20 is in the released position, each Hall Effect sensor 206, 208 will be adjacent to a magnet 200, 204 and so will provide a high logic signal (e.g. binary 1). When the rotor disc brake 20 is in the engaged position but the brake pads have not yet reached their maximum allowable wear condition, neither Hall Effect sensor 206, 208 will be adjacent to a magnet 200, 202, 204 and so both Hall Effect sensors 206, 208 will provide a low logic signal (e.g. binary 0).

When the rotor disc brake 20 is in the engaged position and the brake pads have reached their maximum allowable wear condition, the first Hall Effect sensor 206 will be adjacent to a magnet 202 and so will provide a high logic signal (e.g. binary 1), whereas the second Hall Effect sensor 208 will not be adjacent to a magnet 200, 202, 204 and so will provide a low logic signal (e.g. binary 0).

It will be appreciated that the example using magnets and Hall Effect sensors described above can also be used in a rotor disc brake having two moveable brake pads. Further, the signals produced by the Hall Effect sensors may be processed and/or displayed in the same way as for the signals produced by the switches in the example of FIGS. 3A to 3D.

FIGS. 7A to 7C show a system for monitoring engagement and wear of a rotor brake 120 corresponding to the system of FIG. 5A to 5C but in which the protrusions, 72*a*, 72*b*, 74*a*, 74*b*, 76*a*, 76*b* have been replaced by magnets 200*a*, 200*b*, 202*a*, 202*b*, 204*a*, 204*b*. The respective first and second switches 78*a*, 78*b*, 80*a*, 80*b* have been replaced by respective Hall Effect sensors 206*a*, 206*b*, 208*a*, 208*b*. All elements having reference numbers corresponding to the reference numbers of FIGS. 5A to 5C are identical thereto.

In use, when the rotor disc brake 120 is in the released position, each Hall Effect sensor 206*a*, 206*b*, 208*a*, 208*b* will be adjacent to a magnet 200*a*, 200*b*, 204*a*, 204*b* and so will provide a high logic signal (e.g. binary 1). When the rotor disc brake 120 is in the engaged position but the brake pads have not yet reached their maximum allowable wear condition, none of the Hall Effect sensors 206*a*, 206*b*, 208*a*, 208*b* will be adjacent to a magnet 200*a*, 200*b*, 202*a*, 202*b*, 204*a*, 204*b* and so all the Hall Effect sensors 206*a*, 206*b*, 208*a*, 208*b* will provide a low logic signal (e.g. binary 0). When the rotor disc brake 120 is in the engaged position and the brake pads have reached their maximum allowable wear condition, the first Hall Effect sensors 206*a*, 206*b* will be adjacent to a magnet 202*a*, 202*b* and so will provide a high logic signal (e.g. binary 1), whereas the second Hall Effect sensors 208*a*, 208*b* will not be adjacent to a magnet 200*a*, 200*b*, 202*a*, 202*b*, 204*a*, 204*b* and so will provide a low logic signal (e.g. binary 0).

A system for monitoring engagement and wear of a rotor brake according to an alternative example of the present disclosure is shown in FIG. 8A. The system is shown in the position when the rotor brake 20 is in the engaged position and the brake pads 26, 30 have been worn down to their minimum allowable thickness. This example corresponds substantially to that of FIGS. 3A to 3C. However, in the present example, the pin 38 is not spring loaded. Rather the first end 66 of the pin 38 is fixed to the outer surface 54 of the first brake pad 26 so that it moves therewith. All other elements of this example are as for the example of FIGS. 3A to 3C and so are not described again here.

It will be appreciated that the examples of any of FIGS. 3A to 3C, 5A to 5C, 6A to 6C and 7A to 7C could be modified as in the example of FIG. 8A to provide one or more pins which are attached to and moveable with the one or more moveable brake pads rather than being spring loaded.

As can be seen in FIG. 8B, in the example according to FIG. 8A, the first and second switches 78, 80 and their corresponding processing components if desired can be manufactured as a separate module 94 which can be easily removed for maintenance or to be replaced if required.

Figure 9:
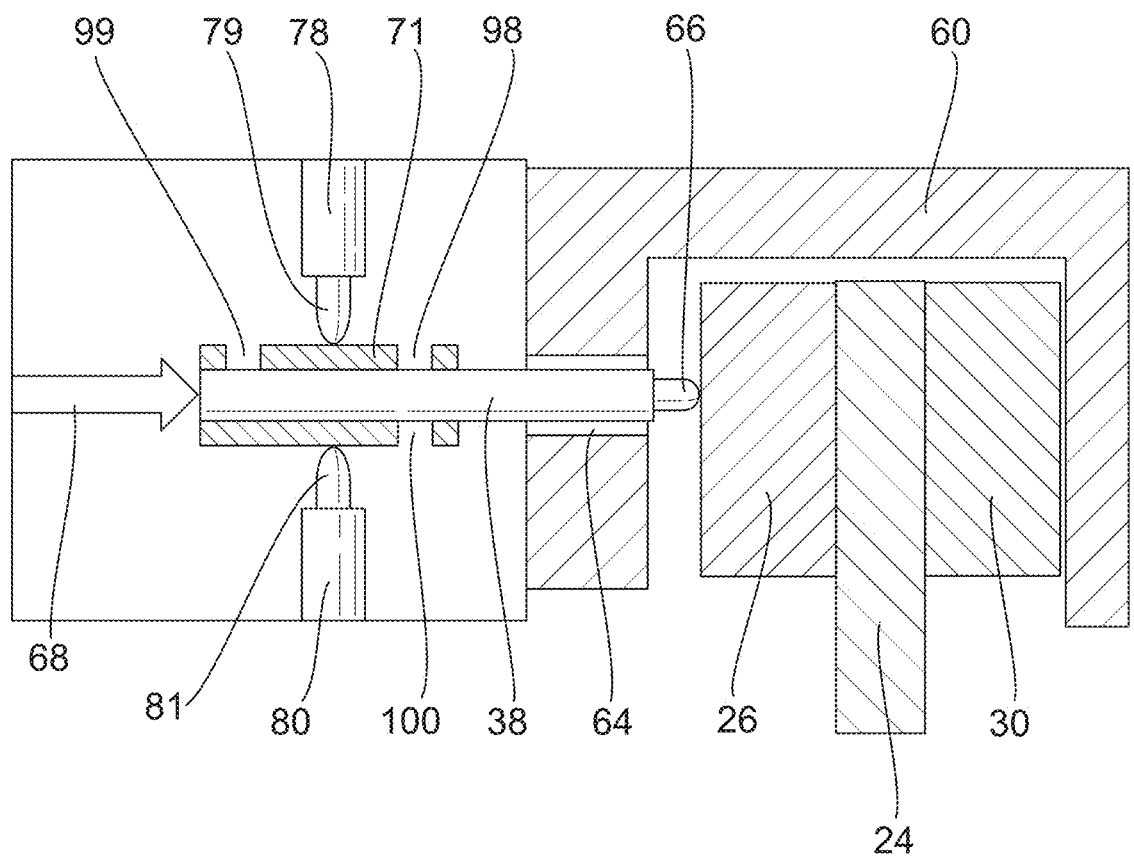
FIG. 9 is a schematic cross sectional view of a system for monitoring engagement and wear of a rotor brake according to an example of the present disclosure when the rotor brake is in the engaged position.

FIG. 9 is a cross sectional view of a system for monitoring engagement and wear of a rotor brake according to an alternative example of the present disclosure. The system of FIG. 9 corresponds substantially to the system of FIGS. 3A to 3D. However, in the system of FIG. 9, the first and second switches 78, 80 are adapted to engage with radially inwardly extending recesses 98, 99,100 provided in the sleeve 71 at locations corresponding to the axial locations of the protrusions 72, 74, 76 of FIGS. 3A to 3D.

Thus, when the rotor brake 20 is in the released position, the first switch 78 extends into a first recess 98 such that the spring loaded switching part 79 thereof extends radially inwardly beyond the outer surface of the sleeve 71. In this position, the first switch 78 is configured to provide a high logic signal (e.g. a binary 1 signal). The second switch 80 extends into a third recess 100 such that the spring loaded switching part 81 thereof extends radially inwardly beyond the outer surface of the sleeve 71. In this position, the second switch 80 is also configured to provide a high logic signal (e.g. a binary 1 signal).

When the rotor brake 20 is in the engaged position but when the first and second brake pads 26, 30 have not yet reached their maximum allowable wear condition, the first switch 78 is engaged with the outer surface of the sleeve 71 such that the spring loaded switching part 79 thereof is pushed radially outwardly. Thus, the first switch 78 provides a low logic signal in this position (e.g. a binary 0 signal).

The second switch 80 is also engaged with the outer surface of the sleeve 71 such that the spring loaded switching 81 part thereof is pushed radially outwardly in this position. Thus, the second switch 80 also provides a low logic signal (e.g. a binary 0 signal).

When the rotor brake 20 is in the engaged position and when the first and second brake pads 26, 30 have also reached their maximum allowable wear condition, the first switch 78 extends into a second recess 99 such that the spring loaded switching part 79 thereof extends radially inwardly beyond the outer surface of the sleeve 71. Thus, the first switch 78 provides a high logic signal (e.g. binary 1).

In this position, the second switch 80 is engaged with the outer surface of the sleeve 71 such that the spring loaded switching part 81 thereof is pushed radially outwardly. Thus, the second switch 80 provides a low logic signal (e.g. binary 0).

It will be understood that the recesses and switches of the example of FIG. 9 could be used in any alternative arrangement of the system according to the disclosure, such as for example, the arrangement shown in FIGS. 5A to 5C.

In any of the examples described above, the signals output from the switches or the Hall Effect sensors may be provided directly to a display (not shown) (for example in a helicopter or other vehicle cockpit) over a wired or wireless connection (not shown). In at least some examples of the present disclosure, the signals may be provided to a processor (not shown) which then activates a display (not shown) (for example in a helicopter or other vehicle cockpit), the display (not shown) showing a message to indicate whether the brake is in the engaged position or the released position and showing a further message to indicate when the brake pads have reached their maximum allowable wear condition. The messages could take the form of LEDs which light up, symbols on a screen, an audio signal or any other suitable form.

In some examples according to the present disclosure, the processor (not shown) may include hardware (not shown) comprising one or more logic circuits (not shown). In other examples according to the present disclosure, the processor (not shown) may additionally or alternatively include software stored on a computer readable medium (not shown).

It will be understood from the above that the systems of the examples described provide a system for sensing both whether a rotor disc brake is in the engaged or released position and when the brake pads of the rotor disc brake have reached their maximum allowable wear condition. By providing the markers for these functionalities in the same system (on the same pin 38 in the examples shown), the system will indicate if the wear switch is malfunctioning (as it will not indicate that the brake is engaged) before the brake pads reach their maximum allowable wear condition. Thus, the system according to examples of the disclosure allows wear switch indicator failure dormancy to be avoided.

The system of any of the examples described herein could be used to monitor the engagement and wear in a brake as discussed above. It will be appreciated that the processor (not shown) could include additional capability to determine when a possible failure of the system had occurred (i.e. when the brake had been engaged but the second signal had not been generated) and to produce a warning signal when this occurred. This would allow inspection and/or maintenance of the system to be carried out in advance of the brake pads reaching their maximum desired wear level, thus reducing the possibility of brake failure due to failure of the system to indicate when maximum desired wear had been reached.

It will be appreciated by those skilled in the art that the present disclosure has been illustrated by describing one or more specific examples thereof, but is not limited to these examples; many variations and modifications are possible, within the scope of the accompanying claims. For instance, the examples of the system for monitoring engagement and wear in a brake shown in the drawings and described above include a first sensing arrangement and a second sensing arrangement. A system (not shown) having only a first sensing arrangement and first and second markers could however be provided which would both provide a signal indicating when the brake was in the engaged position and provide a change from that signal to a further signal indicating when the moveable brake pad and the second brake pad had been worn down by a predetermined amount.

The invention claimed is:

1. A system for monitoring engagement and wear in a brake, the brake comprising: a rotating part defining an axis of rotation; a moveable brake pad located on a first side of the rotating part; and a second brake pad located on a second side of the rotating part, the brake being moveable in use between a released position in which the movable brake pad and the second brake pad do not contact the rotating part, and an engaged position in which the movable brake pad and the second brake pad are in contact with the rotating part, the system comprising:
   a pin, wherein the pin is adapted to extend in an axial direction parallel to the axis of rotation, and to be in contact with and to move with the moveable brake pad in use;
   a first marker positioned on the pin at a first location;
   a second marker spaced from the first marker along the pin;
   a first fixed sensing arrangement,
      wherein in use, the first fixed sensing arrangement is adapted to provide a first signal when adjacent the first or second marker, and a second signal when not adjacent the first or second marker,
      wherein the first and second markers and the first fixed sensing arrangement are positioned such that the second signal indicates that the brake is in the engaged position, and a change from the second signal to the first signal indicates that the moveable brake pad and the second brake pad have been worn down by a predetermined amount;
   a third marker positioned on the pin at a third location corresponding to the first location in the axial direction; and
   a second fixed sensing arrangement adapted to provide a third signal when adjacent the third marker, and a fourth signal when not adjacent the third marker in use,
   wherein in use, when the brake is in the released position, the first fixed sensing arrangement and the second fixed sensing arrangement provide the first signal and the third signal respectively,
   when the brake is in the engaged position and the moveable brake pad and the second brake pad have not been worn down by the predetermined amount, the first fixed sensing arrangement and the second fixed sensing arrangement provide the second signal and the fourth signal respectively, and
   when the brake is in the engaged position and the moveable brake pad and the second brake pad have been worn down by the predetermined amount, the first fixed sensing arrangement and the second fixed sensing arrangement provide the first signal and the fourth signal respectively.

2. A system as claimed in claim 1, the system further comprising a spring adapted to push the pin against the movable brake pad.

3. A system as claimed in claim 1, wherein the pin is fixed to the movable brake pad so as to move therewith in use.

4. A system as claimed in claim 1, wherein the first signal is one of a high or low logic signal, and the second signal is the other of the high or low logic signal.

5. A system as claimed in claim 1, wherein the first and third signals are one of a high or low logic signal, and the second and fourth signals are the other of the high or low logic signal.

6. A system as claimed in claim 1, wherein:
   the first marker comprises a first protrusion extending outwardly from the pin and perpendicular to the axis of rotation, or a first recess extending into the pin and perpendicular to the axis of rotation,
   the second marker comprises a second protrusion extending outwardly from the pin and perpendicular to the axis of rotation, or a second recess extending into the pin and perpendicular to the axis of rotation, and
   the first fixed sensing arrangement comprises a first switch adapted to switch from a first state to a second state when moved inwardly or outwardly by the first or second protrusion or the first or second recess in use.

7. A system as claimed in claim 1, wherein the third marker comprises a third protrusion extending outwardly from the pin and perpendicular to the axis of rotation, or a third recess extending into the pin and perpendicular to the axis of rotation, and wherein the second fixed sensing arrangement comprises a second switch adapted to switch from a first state to a second state when moved inwardly or outwardly by the third protrusion or recess in use.

8. A system as claimed in claim 1, wherein the first and second markers comprise first and second magnets, and wherein the first fixed sensing arrangement comprises a first Hall Effect sensor.

9. A system in claim 8, wherein the third marker comprises a third magnet, and wherein the second fixed sensing arrangement comprises a second Hall Effect sensor.

10. A brake comprising:
   a rotating part defining an axis of rotation;
   a moveable brake pad located on a first side of the rotating part; and
   a second brake pad located on a second side of the rotating part,
   the brake being moveable in use between a released position in which the movable brake pad and the second brake pad do not contact the rotating part, and an engaged position in which the movable brake pad and the second brake pad are in contact with the rotating part,
   the brake further comprising first and second systems for monitoring engagement and wear in a brake, wherein the first and second systems each include:
   a pin, wherein the pin is adapted to extend in an axial direction parallel to the axis of rotation, and to be in contact with and to move with the moveable brake pad in use;
   a first marker positioned on the pin at a first location;
   a second marker spaced from the first marker along the pin; and
   a first fixed sensing arrangement,
      wherein in use, the first fixed sensing arrangement is adapted to provide a first signal when adjacent the first or second marker, and a second signal when not adjacent the first or second marker,
      wherein the first and second markers and the first fixed sensing arrangement are positioned such that the second signal indicates that the brake is in the engaged position, and a change from the second signal to the first signal indicates that the moveable brake pad and the second brake pad have been worn down by a predetermined amount; and
   a third marker positioned on the pin at a third location corresponding to the first location in the axial direction; and
   a second fixed sensing arrangement adapted to provide a third signal when adjacent the third marker, and a fourth signal when not adjacent the third marker in use, wherein in use, when the brake is in the released position, the first fixed sensing arrangement and the second fixed sensing arrangement provide the first signal and the third signal respectively, when the brake is in the engaged position and the moveable brake pad and the second brake pad have not been worn down by the predetermined amount, the first fixed sensing arrangement and the second fixed sensing arrangement provide the second signal and the fourth signal respectively, and when the brake is in the engaged position and the moveable brake pad and the second brake pad have been worn down by the predetermined amount, the first fixed sensing arrangement and the second fixed sensing arrangement provide the first signal and the fourth signal respectively.

11. A brake as claimed in claim 10, wherein the second brake pad is a movable brake pad, wherein the pin of the second system is adapted to be in contact with and to move with the second brake pad in use.

12. A method of monitoring engagement and wear in a brake, the brake comprising: a rotating part defining an axis of rotation, the axis of rotation defining an axial direction; a moveable brake pad located on a first side of the rotating part; and a second brake pad located on a second side of the rotating part, the brake being moveable in use between a released position in which the movable brake pad and the second brake pad do not contact the rotating part, and an engaged position in which the movable brake pad and the second brake pad are in contact with the rotating part, the method comprising:

providing first and second markers at a fixed spacing from one another in the axial direction;

fixing a first sensing arrangement in the axial direction;

causing the first and second markers to move with the movable brake pad in the axial direction in use;

causing the first sensing arrangement to produce a first signal when the first or second marker is adjacent the first sensing arrangement; and causing the first sensing arrangement to produce a second signal when neither the first or second marker is adjacent the first sensing arrangement, wherein the first and second markers and the first sensing arrangement are positioned such that the second signal indicates that the brake is in the engaged position, and a change from the second signal to the first signal indicates that the moveable brake pad and the second brake pad have been worn down by a predetermined amount;

providing a third marker so that it is positioned on the pin at a third location corresponding to the first location in the axial direction; and providing a second fixed sensing arrangement adapted to provide a third signal when adjacent the third marker, and a fourth signal when not adjacent the third marker in use, wherein in use, when the brake is in the released position, the first fixed sensing arrangement and the second fixed sensing arrangement provide the first signal and the third signal respectively, when the brake is in the engaged position and the moveable brake pad and the second brake pad have not been worn down by the predetermined amount, the first fixed sensing arrangement and the second fixed sensing arrangement provide the second signal and the fourth signal respectively, and when the brake is in the engaged position and the moveable brake pad and the second brake pad have been worn down by the predetermined amount, the first fixed sensing arrangement and the second fixed sensing arrangement provide the first signal and the fourth signal respectively.

13. A method as claimed in claim 12, further comprising producing a warning signal indicating that the moveable brake pad and the second brake pad have been worn down by a predetermined amount when a change from the second signal to the first signal is identified.

14. A method as claimed in claim 13, further comprising producing a warning signal indicating that there may be a sensor failure when the brake is in the engaged position but the second signal is not produced.

15. A method as claimed in claim 12, further comprising producing a warning signal indicating that there may be a sensor failure when the brake is in the engaged position but the second signal is not produced.

* * * * *